United States Patent
Zhuo et al.

(10) Patent No.: US 11,216,310 B2
(45) Date of Patent: Jan. 4, 2022

(54) CAPACITY EXPANSION METHOD AND APPARATUS

(71) Applicant: Huawei Technologies Co., Ltd., Shenzhen (CN)

(72) Inventors: Donghui Zhuo, Shenzhen (CN); Jun Xu, Hangzhou (CN); Haijun Shan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 325 days.

(21) Appl. No.: 16/523,028

(22) Filed: Jul. 26, 2019

(65) Prior Publication Data

US 2019/0347134 A1  Nov. 14, 2019

Related U.S. Application Data

(63) Continuation of application No. PCT/CN2018/073672, filed on Jan. 22, 2018.

(30) Foreign Application Priority Data

Jan. 26, 2017 (CN) .......................... 201710061782.3

(51) Int. Cl.
| | |
|---|---|
| G06F 9/50 | (2006.01) |
| G06F 13/00 | (2006.01) |
| G06N 5/00 | (2006.01) |
| G06N 5/02 | (2006.01) |
| G06N 20/00 | (2019.01) |
| G06F 11/30 | (2006.01) |

(52) U.S. Cl.
CPC .............. G06F 9/5027 (2013.01); G06F 9/50 (2013.01); G06F 9/5005 (2013.01);
(Continued)

(58) Field of Classification Search
CPC ........ G06F 9/50; G06F 9/5005; G06F 9/5027; G06F 9/5061; G06F 9/5072;
(Continued)

(56) References Cited

U.S. PATENT DOCUMENTS

2011/0307412 A1* 12/2011 Rolia ................... G06Q 10/06
                                                                 705/348
2013/0185433 A1*  7/2013 Zhu .................... H04L 43/0882
                                                                 709/226
(Continued)

FOREIGN PATENT DOCUMENTS

| CN | 106227605 A | 12/2016 |
| CN | 106301864 A | 1/2017 |
| CN | 106302626 A | 1/2017 |

OTHER PUBLICATIONS

Machine Translation and Abstract of Chinese Publication No. CN106227605, Dec. 14, 2016, 36 pages.
Machine Translation and Abstract of Chinese Publication No. CN106301864, Jan. 4, 2017, 23 pages.
(Continued)

Primary Examiner — Charles M Swift
(74) Attorney, Agent, or Firm — Conley Rose, P.C.

(57) ABSTRACT

A capacity expansion method includes obtaining a measured workload of a service of an application, obtaining an application model of the application, and obtaining a measured workload of each upper-level service of the service; determining a predicted workload of the service based on the measured workload of the service, determining the measured workload of each upper-level service of the first service, and determining a first workload ratio corresponding to a first calling relationship; and determining a predicted workload of each lower-level service based on the predicted workload of the service and determining a second workload ratio corresponding to a second calling relationship.

20 Claims, 14 Drawing Sheets

(52) U.S. Cl.
CPC .......... *G06F 9/5072* (2013.01); *G06F 9/5077* (2013.01); *G06F 9/5083* (2013.01); *G06F 11/30* (2013.01); *G06F 11/3003* (2013.01); *G06F 11/3006* (2013.01); *G06N 5/00* (2013.01); *G06N 5/02* (2013.01); *G06N 20/00* (2019.01)

(58) Field of Classification Search
CPC ...... G06F 9/5077; G06F 9/5083; G06F 11/30; G06F 11/3003; G06F 11/3006; G06N 5/00; G06N 5/02; G06N 20/00
See application file for complete search history.

(56) References Cited

U.S. PATENT DOCUMENTS

| | | |
|---|---|---|
| 2015/0339169 A1 | 11/2015 | Siddiqui et al. |
| 2016/0139885 A1 | 5/2016 | Dube et al. |
| 2016/0323377 A1* | 11/2016 | Einkauf ................ G06F 9/5077 |

OTHER PUBLICATIONS

Machine Translation and Abstract of Chinese Publication No. CN106302626, Jan. 4, 2017, 13 pages.
Foreign Communication From A Counterpart Application, PCT Application No. PCT/CN2018/073672, English Translation of International Search Report dated Apr. 23, 2018, 2 pages.
Foreign Communication From A Counterpart Application, PCT Application No. PCT/CN2018/073672, English Translation of Written Opinion dated Apr. 23, 2018, 6 pages.

* cited by examiner

Coarse-grained model

2A

Fine-grained model

2B

CAPACITY EXPANSION METHOD AND APPARATUS

CROSS-REFERENCE TO RELATED APPLICATIONS

This application is a continuation application of International Application No. PCT/CN2018/073672, filed on Jan. 22, 2018, which claims priority to Chinese Patent Application No. 201710061782.3, filed on Jan. 26, 2017. The disclosures of the aforementioned applications are hereby incorporated by reference in their entireties.

TECHNICAL FIELD

This application relates to the field of communications technologies, and in particular, to a capacity expansion method and apparatus.

BACKGROUND

Platform as a service (PaaS) is a cloud service manner focusing on platform services and includes capabilities such as application deployment, upgrade, and capacity expansion. Capacity expansion in the PaaS is provided by an auto scaling mechanism. In an existing auto scaling mechanism, an individual service is used as a control object. When an application runs on the PaaS platform, an auto scaling controller of each service may dynamically add or release a resource for the service depending on workload requirement in an embodiment using the auto scaling mechanism.

However, a microservice concept is gradually used during current software development. Microservice focuses on breaking down an application by function into a plurality of small services. Each service is developed and maintained independently. Services communicate with each other using a lightweight network protocol. The plurality of services are mutually called, to implement a function of the application. After the application is broken down into a plurality of microservices, overall complexity of the application is reduced, but a new requirement is also raised for resource auto scaling. As shown in FIG. 1, assuming that an application includes a service A, a service B, a service C, a service D, and a service E, according to the existing auto scaling mechanism, resource capacity expansion can only be performed on the services of the application level by level. When the service A has a large quantity of service requests, capacity expansion is first performed on the service A. Before capacity expansion for the service A is completed, the service B cannot be aware that capacity expansion is required, and request queues of the service B and the service C are congested with the large quantity of service requests. After a period of time, as resource usage of the service B and the service C continue to increase, the auto scaling mechanism enables capacity expansion for the service B and the service C. However, overall performance of the application is still not improved, because the service D and the service E become a new performance bottleneck. This level-based capacity expansion manner takes a very long time to complete overall capacity expansion for the application. Consequently, a waiting time is excessively long when a user requests an application service, and even no response is received from the application. User experience is relatively poor.

Therefore a problem of improving capacity expansion efficiency is to be resolved.

SUMMARY

Embodiments of this application provide a capacity expansion method and apparatus in order to resolve a problem that level-based capacity expansion is inefficient.

To achieve the foregoing objective, the following technical solutions are used in the embodiments of this application.

According to one aspect, a capacity expansion method is provided, where the method includes obtaining a measured workload of a first service of an application and an application model of the application, where the application model includes a calling relationship between all services of the application and a workload ratio corresponding to each of the calling relationship, and the first service is any one of the services, determining each upper-level service of the first service based on a first calling relationship, in the application model, between the first service and each upper-level service of the first service, and determining each lower-level service of the first service based on a second calling relationship, in the application model, between the first service and each lower-level service of the first service, obtaining a measured workload of each upper-level service of the first service, determining a predicted workload of the first service based on the measured workload of the first service, the measured workload of each upper-level service of the first service, and a first workload ratio corresponding to the first calling relationship, determining a predicted workload of each lower-level service based on the predicted workload of the first service and a second workload ratio corresponding to the second calling relationship, and performing capacity expansion on each target service based on a predicted workload of each of all target services, where all the target services include the first service and each lower-level service of the first service. According to the capacity expansion method provided in this embodiment of this application, capacity expansion is performed based on the application model. The application model can represent the calling relationship between the services of the application and the workload ratio corresponding to the calling relationship, and therefore a capacity expansion apparatus can predict a predicted workload of any service of the application based on the application model of the application to obtain predicted workloads of all target services, and can further perform capacity expansion simultaneously on all the target services based on the predicted workloads of all the target services. Compared with the other approaches that capacity expansion can only be performed on services level by level, this improves a capacity expansion efficiency, can rapidly improve overall performance of the application within a short period, and further guarantees service level agreement (SLA) indicators such as application reliability, throughput, and response delay.

In a possible implementation, before the obtaining an application model, the method further includes obtaining a service interface description file of each of the services and a configuration file of each service, where the service interface description file of each service includes a name of each service, and the configuration file of each service includes a calling relationship between each service and a lower-level service of each service, determining the calling relationship between the services based on the calling relationship between each service and the lower-level service of each service, obtaining a workload history of each service based on the name of each service, and determining, based on the workload history and the calling relationship between the services, the workload ratio corresponding to each calling relationship, and generating the application model based on the calling relationship between the services and the workload ratio corresponding to each calling relationship. According to the method for generating an application model provided in this embodiment of this application, the calling relationship between the services of the application is determined based on the service interface description file of the service and the configuration file of the service, and the application model of the application is determined based on the calling relationship between the services and by calculating the workload ratio corresponding to each calling relationship. In other words, the application model can represent the calling relationship between the services of the application and the workload ratio corresponding to the calling relationship. Therefore, the capacity expansion apparatus can predict a predicted workload of any service of the application based on the application model of the application to obtain predicted workloads of all target services, and can further perform capacity expansion simultaneously on all the target services based on the predicted workloads of all the target services, thereby improving a capacity expansion efficiency. Further, this can rapidly improve overall performance of the application within a short period, and further guarantees SLA indicators such as application reliability, throughput, and response delay.

In a possible implementation, the workload history of each service is obtained based on the name of each service, and the workload ratio corresponding to each calling relationship is updated based on the workload history and each calling relationship, and the application model is updated based on each calling relationship and an updated workload ratio corresponding to each calling relationship. According to the method for updating an application model provided in this embodiment of this application, the workload ratio corresponding to each calling relationship in the application model is updated based on the obtained workload history of each service such that the application model can more efficiently reflect a change in the workload ratio between services, and when capacity expansion is required, capacity expansion can be performed rapidly and a more efficiently instance to be expanded can be obtained. This guarantees SLA indicators such as application reliability, throughput, and response delay.

In a possible implementation, if a third service is added to an updated application, a service interface description file of the third service, a configuration file of the third service, and an updated configuration file of each of at least one fourth service are obtained, where the service interface description file of the third service includes a name of the third service, the configuration file of the third service includes a third calling relationship between the third service and each of at least one fifth service, the updated configuration file of each fourth service includes a fourth calling relationship between each fourth service and the third service, the fourth service is an upper-level service of the third service, and the fifth service is a lower-level service of the third service, the calling relationship between the services is updated based on the application model, the third calling relationship, and the fourth calling relationship, a workload history of each of all services of the updated application is obtained based on a name of each of the services of the updated application, and a workload ratio corresponding to each of an updated calling relationship between the services is determined based on the workload history of each of the services of the updated application and the updated calling relationship between the services, and the application model of the application is updated based on the updated calling relationship between the services and the workload ratio corresponding to each of the updated calling relationship between the services. According to the method for updating a model provided in this embodiment of this application, all calling relationships and workload ratios of the application are updated when a service is added to the application such that the application model can more accurately reflect a change in the calling relationship and the workload ratio after the application is updated, and when capacity expansion is required, capacity expansion can be performed rapidly and a more accurate instance to be expanded can be obtained. This guarantees SLA indicators such as application reliability, throughput, and response delay.

In a possible implementation, if a sixth service is deleted from the updated application, an updated configuration file of each of at least one seventh service is obtained, where before the sixth service is deleted from the application, the seventh service is an upper-level service of the sixth service, and after the sixth service is deleted from the application, the updated configuration file of each seventh service includes a fifth calling relationship between each seventh service and at least one eighth service, and the eighth service is a lower-level service of the seventh service, the calling relationship between the services is updated based on the application model and the fifth calling relationship, a workload history of each of all services of the updated application is obtained based on a name of each of the services of the updated application, and a workload ratio corresponding to each of an updated calling relationship between the services is determined based on the workload history of each of the services of the updated application and the updated calling relationship between the services, and the application model of the application is updated based on the updated calling relationship between the services and the workload ratio corresponding to each of the updated calling relationship between the services. According to the method for updating a model provided in this embodiment of this application, all calling relationships and workload ratios of the application are updated when a service is deleted from the application such that the application model can more accurately reflect a change in the calling relationship and the workload ratio after the application is updated, and when capacity expansion is required, capacity expansion can be performed rapidly and a more accurate instance to be expanded can be obtained. This guarantees SLA indicators such as application reliability, throughput, and response delay.

In a possible implementation, the determining a predicted workload of the first service based on the measured workload of the first service, the measured workload of each upper-level service of the first service, and a first workload ratio corresponding to the first calling relationship includes determining the predicted workload of the first service according to a preset formula, where the preset formula includes $f(v_i)=\max(d(v_i), \Sigma_{k \in K} f(k)*e_{ki})$, where V indicates a set of the services of the application, K indicates a set of upper-level services k of a service i of the application, $K \in V$, $v_i$ indicates the service i, $d(v_i)$ indicates a measured workload of the service i, $f(k)$ indicates a measured workload of the upper-level service k of the service i, $e_{ki}$ indicates a workload ratio between the service k and the service i, and the service i is any one of the services. This embodiment of this application provides a specific implementation for determining the predicted workload of the first service. $\Sigma_{k \in K} f(k)*e_{ki}$ indicates a workload of the service i that is calculated based on $f(k)$ and $e_{ki}$, $\max(d(v_i), \Sigma_{k \in K} f(k)*e_{ki})$ indicates that a larger value of $\Sigma_{k \in K} f(k)*e_{ki}$ and $d(v_i)$ is determined as a predicted workload of the service i. Two factors, that is, the measured workload of the first service and a workload of the first service that is determined based on the measured workload of the upper-level service of the first service, are considered, and therefore a more accurate predicted workload of the first service can be obtained, and a more accurate quantity of instances to be expanded can be obtained. This can further guarantees SLA indicators such as application reliability, throughput, and response delay.

In a possible implementation, the performing capacity expansion on each target service based on a predicted workload of each of all target services includes determining, based on the predicted workload of each target service and a restored correspondence between a workload of each target service and a quantity of instances, a first quantity of instances to be expanded for each target service, and performing capacity expansion on each target service based on the first quantity of instances. According to the capacity expansion method provided in this embodiment of this application, the predicted workload and the restored correspondence between the workload and the quantity of instances are compared, to more accurately determine a quantity of instances to be expanded such that capacity expansion can be performed rapidly for the application and a more accurate instance to be expanded is obtained. This guarantees SLA indicators such as application reliability, throughput, and response delay.

In a possible implementation, before the performing capacity expansion on each target service based on the first quantity of instances, the method further includes obtaining a resource utilization rate of each target service, if the resource utilization rate of each target service exceeds a preset threshold, determining, based on a restored correspondence between the resource utilization rate of each target service and a quantity of instances, a second quantity of instances to be expanded for each target service, and determining, based on the first quantity of instances and the second quantity of instances, a target quantity of instances to be expanded for each target service, and performing capacity expansion on each target service based on the target quantity of instances. According to the capacity expansion method provided in this embodiment of this application, when capacity expansion is performed on the application, a quantity of instances that is obtained based on a resource utilization rate can be determined based on a resource utilization rate of each service, and a more accurate target quantity of instances to be expanded can be obtained based on the quantity of instances that is determined based on the predicted workload and the quantity of instances that is obtained based on the resource utilization rate such that capacity expansion can be performed rapidly for the application based on a more accurate instance to be expanded. This guarantees SLA indicators such as application reliability, throughput, and response delay.

In a possible implementation, the determining, based on the first quantity of instances and the second quantity of instances, a target quantity of instances to be expanded for each target service includes if the first quantity of instances is greater than the second quantity of instances, determining the first quantity of instances as the target quantity of instances to be expanded for each target service, or if the first quantity of instances is not greater than the second quantity of instances, determining the second quantity of instances as the target quantity of instances to be expanded for each target service. In this embodiment of this application, two manners are used to determine the target quantity of instances to be expanded such that application capacity expansion triggered by a plurality of conditions can be implemented. Quantities of instances determined in two different manners are compared such that a more accurate quantity of instances to be expanded can be obtained while capacity expansion is performed rapidly. Therefore, capacity expansion can be performed rapidly for the application and a more accurate instance to be expanded can be obtained. This guarantees SLA indicators such as application reliability, throughput, and response delay.

According to another aspect, a capacity expansion apparatus is provided, where the capacity expansion apparatus includes a workload estimator and a scaling controller, the workload estimator is configured to obtain a measured workload of a first service of an application and an application model of the application, where the application model includes a calling relationship between all services of the application and a workload ratio corresponding to each of the calling relationship, and the first service is any one of the services, determine each upper-level service of the first service based on a first calling relationship, in the application model, between the first service and each upper-level service of the first service, and determine each lower-level service of the first service based on a second calling relationship, in the application model, between the first service and each lower-level service of the first service, obtain a measured workload of each upper-level service of the first service, determine a predicted workload of the first service based on the measured workload of the first service, the measured workload of each upper-level service of the first service, and a first workload ratio corresponding to the first calling relationship, and determine a predicted workload of each lower-level service based on the predicted workload of the first service and a second workload ratio corresponding to the second calling relationship, and the scaling controller is configured to perform capacity expansion on each target service based on a predicted workload of each of all target services, where all the target services include the first service and each lower-level service of the first service.

In a possible implementation, the capacity expansion apparatus further includes a model generator, and the model generator is configured to obtain a service interface description file of each of the services and a configuration file of each service, where the service interface description file of each service includes a name of each service, and the configuration file of each service includes a calling relationship between each service and a lower-level service of each service, determine the calling relationship between the services based on the calling relationship between each service and the lower-level service of each service, obtain a workload history of each service based on the name of each service, and determine, based on the workload history and the calling relationship between the services, the workload ratio corresponding to each calling relationship, and generate the application model based on the calling relationship between the services and the workload ratio corresponding to each calling relationship.

In a possible implementation, the capacity expansion apparatus further includes a model updater, and the model updater is configured to obtain the workload history of each service based on the name of each service, and update the workload ratio corresponding to each calling relationship based on the workload history and each calling relationship, and update the application model based on each calling relationship and an updated workload ratio corresponding to each calling relationship.

In a possible implementation, the capacity expansion apparatus further includes a model updater, and the model updater is configured to if a third service is added to an updated application, obtain a service interface description file of the third service, a configuration file of the third service, and an updated configuration file of each of at least one fourth service, where the service interface description file of the third service includes a name of the third service, the configuration file of the third service includes a third calling relationship between the third service and each of at least one fifth service, the updated configuration file of each fourth service includes a fourth calling relationship between each fourth service and the third service, the fourth service is an upper-level service of the third service, and the fifth service is a lower-level service of the third service, update the calling relationship between the services based on the application model, the third calling relationship, and the fourth calling relationship, obtain a workload history of each of all services of the updated application based on a name of each of the services of the updated application, and determine, based on the workload history of each of the services of the updated application and an updated calling relationship between the services, a workload ratio corresponding to each of the updated calling relationship between the services, and update the application model of the application based on the updated calling relationship between the services and the workload ratio corresponding to each of the updated calling relationship between the services.

In a possible implementation, the capacity expansion apparatus further includes a model updater, and the model updater is configured to, if a sixth service is deleted from the updated application, obtain an updated configuration file of each of at least one seventh service, where before the sixth service is deleted from the application, the seventh service is an upper-level service of the sixth service, and after the sixth service is deleted from the application, the updated configuration file of each seventh service includes a fifth calling relationship between each seventh service and at least one eighth service, and the eighth service is a lower-level service of the seventh service, update the calling relationship between the services based on the application model and the fifth calling relationship, obtain a workload history of each of all services of the updated application based on a name of each of the services of the updated application, and determine, based on the workload history of each of the services of the updated application and an updated calling relationship between the services, a workload ratio corresponding to each of the updated calling relationship between the services, and update the application model of the application based on the updated calling relationship between the services and the workload ratio corresponding to each of the updated calling relationship between the services.

In a possible implementation, the workload estimator is further configured to determine the predicted workload of the first service according to a preset formula, where the preset formula includes $f(v_i)=\max(d(v_i), \Sigma_{k \in K} f(k)*e_{ki})$, where V indicates a set of the services of the application, K indicates a set of upper-level services k of a service i of the application, $K \in V$, $v_i$ indicates the service i, $d(v_i)$ indicates a measured workload of the service i, $f(k)$ indicates a measured workload of the upper-level service k of the service i, $e_{ki}$ indicates a workload ratio between the service k and the service i, and the service i is any one of the services.

In a possible implementation, the scaling controller is further configured to determine, based on the predicted workload of each target service and a restored correspondence between a workload of each target service and a quantity of instances, a first quantity of instances to be expanded for each target service, and perform capacity expansion on each target service based on the first quantity of instances.

In a possible implementation, the scaling controller is further configured to, before performing capacity expansion on each target service based on the first quantity of instances, obtain a resource utilization rate of each target service, if the resource utilization rate of each target service exceeds a preset threshold, determine, based on a restored correspondence between the resource utilization rate of each target service and a quantity of instances, a second quantity of instances to be expanded for each target service, and determine, based on the first quantity of instances and the second quantity of instances, a target quantity of instances to be expanded for each target service, and perform capacity expansion on each target service based on the target quantity of instances.

In a possible implementation, the scaling controller is further configured to, if the first quantity of instances is greater than the second quantity of instances, determine the first quantity of instances as the target quantity of instances to be expanded for each target service, or if the first quantity of instances is not greater than the second quantity of instances, determine the second quantity of instances as the target quantity of instances to be expanded for each target service.

According to still another aspect, an embodiment of this application provides a capacity expansion apparatus, including a processor, a memory, a bus, and a commutations interface, where the memory is configured to store a computer executable instruction, the processor is connected to the memory using the bus, and when the capacity expansion apparatus runs, the processor executes the computer executable instruction stored in the memory such that the capacity expansion apparatus executes the capacity expansion method according to any one of the foregoing aspects.

According to still another aspect, an embodiment of this application provides a computer storage medium, where the computer storage medium is configured to store a computer software instruction used by the capacity expansion method according to any one of the foregoing aspects, and the computer software instruction contains a program designed for executing the capacity expansion method according to any one of the foregoing aspects.

According to still another aspect, an embodiment of this application provides a computer program, where the computer program includes an instruction, and when the computer program is executed by a computer, the computer is caused to perform a procedure in the capacity expansion method according to any one of the foregoing aspects.

In addition, for technical effects brought by any design manner in the foregoing capacity expansion apparatus embodiments, refer to technical effects brought by different design manners in the foregoing capacity expansion method embodiment. Details are not repeated herein.

These or other aspects of this application are more concise and comprehensible in descriptions of the following embodiments.

DESCRIPTION OF EMBODIMENTS

To facilitate understanding of the solutions of this application, related definitions are first provided in this application.

Application: In a software development concept, an application is an executable file that is connected by a function library, and the executable file provides all functions of the application.

Instance: A service in an application is executed by a plurality of instances, each instance is referred to as a service instance of the service, each service instance is an executing unit of the service, and the executing unit can execute a fixed amount of work.

Figure 2:
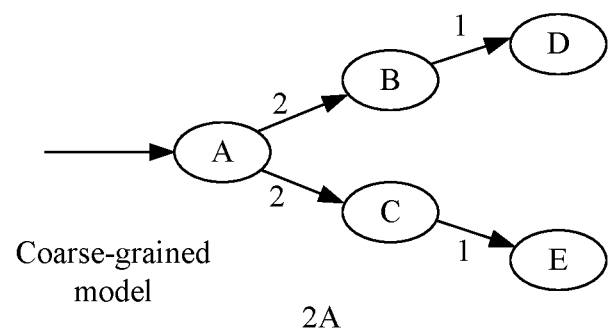
FIG. 2 is a schematic diagram of an application model according to an embodiment of this application.
Figure 2:
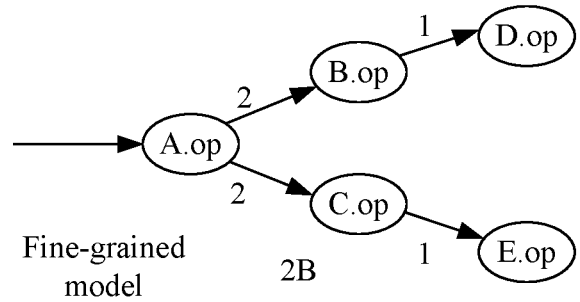

Application model: An application model is a directed graph including a node, an edge, and an edge weight value. As shown in FIG. 2, FIG. 2 is a schematic diagram of an application model according to an embodiment of this application. In this embodiment of this application, the application model may be classified into a coarse-grained model and a fine-grained model according to a definition of the node.

In the coarse-grained model, each node represents a service, each directed edge represents a calling relationship between services, and an edge weight value represents a ratio of a workload generated when a service is called. As shown in 2A of FIG. 2, 2A is a schematic diagram of a coarse-grained application model according to an embodiment of this application. A node A represents a service A, a node B represents a service B, a node C represents a service C, a node D represents a service D, and a node E represents a service E. One workload on the service A requires two workloads on the service B and two workloads on the service C, one workload on the service B requires one workload on the service D, and one workload on the service C requires one workload on the service E.

In the fine-grained model, each node represents each function of each service in an application, each directed edge represents a calling relationship between functions, and an edge weight value represents a ratio of a workload generated when a function is called. As shown in 2B of FIG. 2, 2B is a schematic diagram of a fine-grained application model according to an embodiment of this application. Assuming that 2B of FIG. 2 shows a partial application model corresponding to a service S in an application Y, a node A.op represents a function A of the service S in the application Y, a node B.op represents a function B of the service S in the application Y, a node C.op represents a function C of the service S in the application Y, a node D.op represents a function D of the service S in the application Y, and a node E.op represents a function E of the service S in the application Y. One workload on the function A requires two workloads on the function B and two workloads on the function C, one workload on the function B requires one workload on the function D, and one workload on the function C requires one workload on the function E.

It should be noted that in this embodiment of this application, a fine-grained model-based predicted workload is more accurate but maintenance costs are relatively high, and a coarse-grained model-based predicted workload is of intermediate accuracy but maintenance is convenient. The coarse grain can be used to resolve an existing problem of slow capacity expansion. In addition, creation and maintenance methods of the coarse-grained model are the same as those of the fine-grained model. Therefore, the coarse-grained model is used as an example for description in the embodiments of this application.

It should be noted that "I" in this specification means or. For example, AB means A or B. "And/or" in this specification describes only an association relationship for describing associated objects and represents that three relationships may exist. For example, A and/or B may represent the following three cases, for example, only A exists, both A and B exist, and only B exists. "A plurality of" means two or more.

As described in this application, terms "component", "module", "system", or the like are used to represent a computer-related entity. The computer-related entity may be hardware, firmware, a combination of hardware and software, software, or running software. For example, a component may be but is not limited to a process that runs on a processor, a processor, an object, an executable file, a thread being executed, a program, and/or a computer. In an example, both a computer device and an application that runs on the computer device may be components. One or more components may exist within a process being executed and/or a thread being executed, and a component may be located on one computer and/or distributed on two or more computers. In addition, these components may be executed from various computer-readable media that have various data structures. These components may communicate using a local process and/or a remote process and based on, for example, a signal having one or more data packets (for example, data from one component, where the component interacts with another component in a local system or a distributed system, and/or interacts with other systems via a network such as the Internet using a signal).

It should be noted that in the embodiments of this application, terms such as "an example" or "for example" are used to represent examples, illustrations, or explanations. Any embodiment or design solution described as "an example" or "for example" in the embodiments of this application shall not be interpreted to be more preferable or advantageous than other embodiments or design solutions. In an embodiment, the terms such as "an example" or "for example" are intended to present related concepts in a specific manner.

It should be noted that in the embodiments of this application, "of (of)", "relevant (corresponding, relevant)", and "corresponding (corresponding)" may be used interchangeably sometimes. It should be noted that they express a same meaning unless a difference needs to be emphasized.

The following describes the technical solutions in the embodiments of this application with reference to the accompanying drawings in the embodiments of this application.

To better describe the capacity expansion method in the embodiments of this application, an application scenario of the embodiments of this application is first provided.

Figure 1:
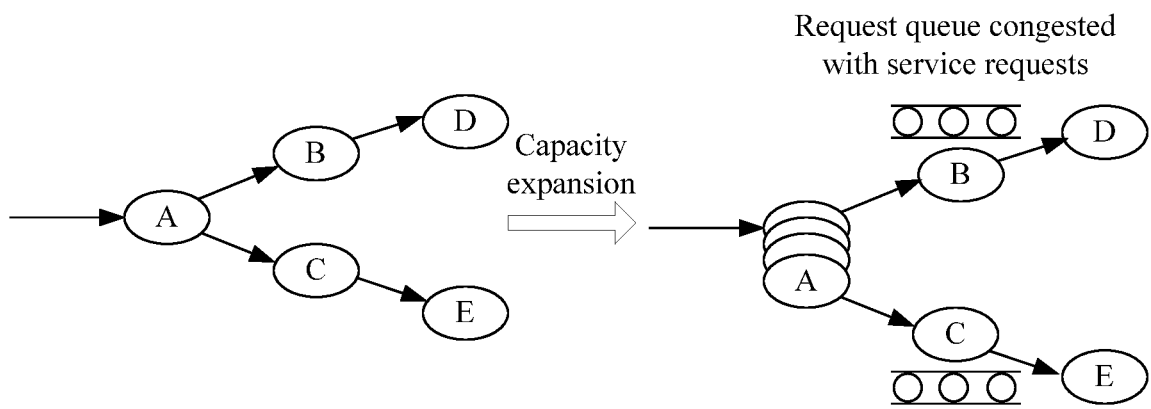
FIG. 1 is a schematic diagram of a capacity expansion method of an existing auto-scaling mechanism.

As shown in FIG. 1 in Background, it is assumed that the application 1 includes five services the service A, the service B, the service C, the service D, and the service E. The service A is an upper-level service of the service B and the service C. The service B is an upper-level service of the service D. The service C is an upper-level service of the service E. The service B, the service C, the service D, and the service E are all lower-level services of the service A. It takes a very long time to complete overall capacity expansion on the application based on the existing level-based capacity expansion manner. Consequently, a waiting time is excessively long when a user requests an application service, and even no response is received from the application service. User experience is relatively poor. Therefore, how to improve a capacity expansion efficiency is a problem urgently to be resolved currently.

To resolve this problem, the embodiments of this application provide a capacity expansion method and apparatus in order to perform capacity expansion simultaneously on services in an application, thereby improving a capacity expansion efficiency. To achieve the foregoing objective, the following technical solutions are used in the embodiments of this application.

Figure 3:
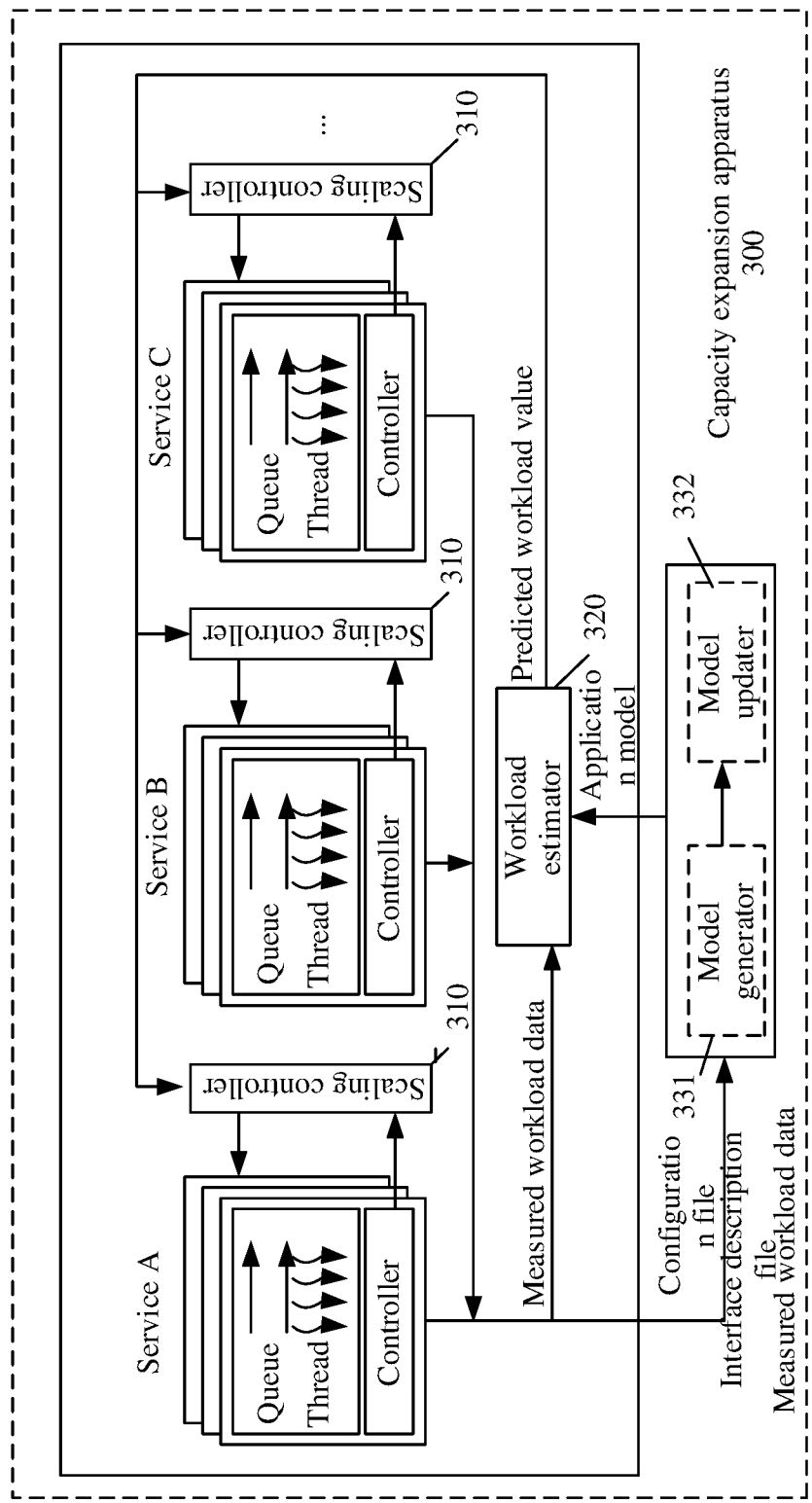
FIG. 3 is a schematic structural diagram of a capacity expansion apparatus according to an embodiment of this application.

FIG. 3 is a schematic structural diagram of a capacity expansion apparatus according to an embodiment of this application. The capacity expansion apparatus 300 includes a scaling controller 310 and a workload estimator 320. The scaling controller 310 is configured to determine a target capacity expansion quantity based on a predicted workload of a corresponding target service and perform capacity expansion on the target service. For example, a scaling controller of the service A is configured to determine a target capacity expansion quantity of the service A based on a predicted workload of the service A and perform capacity expansion on the service A, a scaling controller of the service B is configured to determine a target capacity expansion quantity of the service B based on a predicted workload of the service B and perform capacity expansion on the service B, a scaling controller of the service C is configured to determine a target capacity expansion quantity of the service C based on a predicted workload of the service C and perform capacity expansion on the service C, and so on. The workload estimator 320 is configured to estimate predicted workloads of all target services based on an application model. For example, the workload estimator 320 estimates predicted workloads of services such as the service A, the service B, and the service C based on an application model. A specific capacity expansion manner and a specific workload prediction manner are described in the following method embodiment, and details are not described herein.

The application model in this embodiment of this application may be an application model that is generated by a model generator 331 or an application model that is updated by a model updater 332. This is not specifically limited in this embodiment of this application. Specific manners for generating the application model and updating the application model are described in the following method embodiment, and details are not described herein.

In addition, the model generator 331 and the model updater 332 in FIG. 3 may be integrated in the capacity expansion apparatus provided in this embodiment of this application, or may be deployed independently of the capacity expansion apparatus provided in this embodiment of this application. This is not specifically limited in this embodiment of this application.

In the capacity expansion apparatus 300 shown in FIG. 3, a queue in each service is used to temporarily store work that the service needs to handle, a thread in each service is used to handle work in the service, and a controller in each service is used to send a workload to the capacity expansion apparatus 300. The explanations are provided herein, and details are not described again later.

Figure 4:
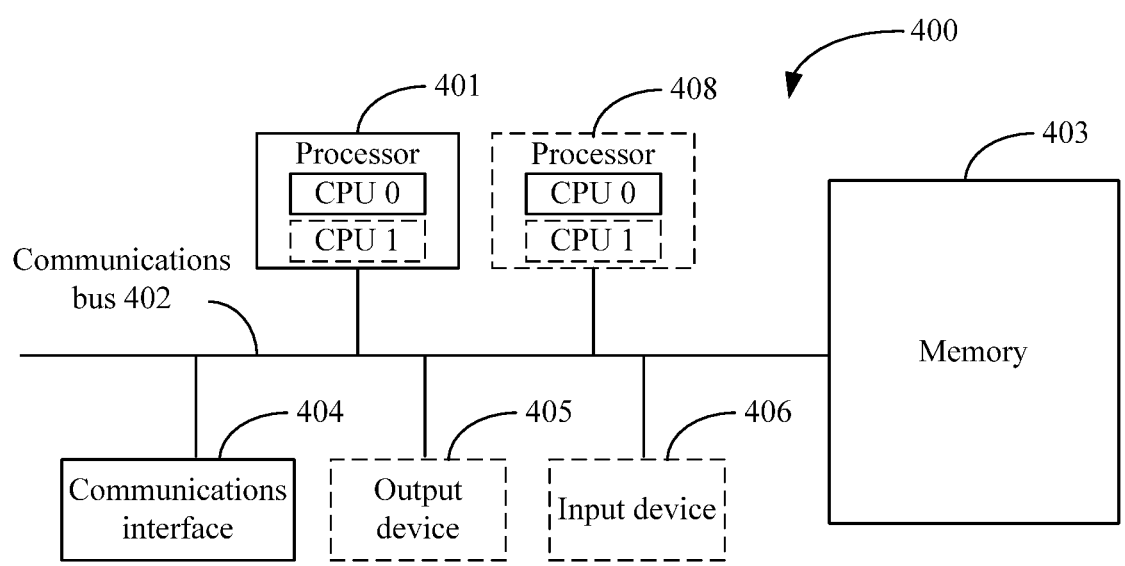
FIG. 4 is a schematic diagram of a computer device according to an embodiment of this application.

As shown in FIG. 4, the service capacity expansion apparatus in this embodiment of this application may be implemented by a computer device (or a system) in FIG. 4.

FIG. 4 is a schematic diagram of a computer device according to an embodiment of this application. The computer device 400 includes at least one processor 401, a communications bus 402, a memory 403, and at least one communications interface 404.

The processor 401 may be a general-purpose Central Processing Unit (CPU), a microprocessor, an Application-Specific Integrated Circuit (ASIC), or one or more integrated circuits configured to control execution of programs of the solutions of this application.

The communications bus 402 may include a channel and transfer information between the foregoing components.

The communications interface 404 is configured to communicate, using any apparatus such as a transceiver, with another device or a communications network such as Ethernet, a Radio Access Network (RAN), or a Wireless Local Area Network (WLAN).

The memory 403 may be a Read-Only Memory (ROM), another type of static storage device that is capable of storing static information and instructions, a Random Access Memory (RAM), or another type of dynamic storage device that is capable of storing information and instructions, or may be an Electrically Erasable Programmable Read-Only Memory (EEPROM), a Compact Disc Read-Only Memory (CD-ROM) or another optical disk storage, an optical disc storage (including a compact optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer, but is not limited thereto. The memory may exist independently, and is connected to the processor using the bus. Alternatively, the memory may be integrated with the processor.

The memory 403 is configured to store application program code for executing the solutions of this application, and the processor 401 controls execution of the application program code. The processor 401 is configured to execute the application program code that is stored in the memory 403, to implement the capacity expansion method in the embodiments of this application.

During specific implementation, in an embodiment, the processor 401 may include one or more CPUs, for example, a CPU 0 and a CPU 1 in FIG. 4.

During specific implementation, in an embodiment, the computer device 400 may include a plurality of processors, for example, the processor 401 and a processor 408 in FIG. 4. Each of the processors may be a single-core processor, or may be a multi-core processor). The processors herein may be one or more devices, circuits, and/or processing cores for processing data (for example, computer program instructions).

During specific implementation, in an embodiment, the computer device 400 may further include an output device 405 and an input device 406. The output device 405 communicates with the processor 401, and may display information in a plurality of manners. For example, the output device 405 may be a Liquid Crystal Display (LCD), a Light Emitting Diode (LED) display device, a Cathode Ray Tube (CRT) display device, a projector, or the like. The input device 406 communicates with the processor 401, and may receive a user input in a plurality of manners. For example, the input device 406 may be a mouse, a keyboard, a touchscreen device, a sensor device, or the like.

The computer device 400 may be a general-purpose computer device or a dedicated computer device. During specific implementation, the computer device 400 may be a desktop computer, a portable computer, a network server, a Personal Digital Assistant (PDA), a mobile phone, a tablet computer, a wireless terminal device, a communications device, an embedded device, or a device with a structure similar to that in FIG. 4. A type of the computer device 400 is not limited in this embodiment of this application.

As described above, in the capacity expansion method provided in the embodiments of this application, an application model of an application needs to be used. Therefore, a process of generating the application model is first provided as follows.

The model generator 331 generates the application model, including steps K1 to K4.

K1: Obtain a service interface description file of each of all services and a configuration file of each service.

The service interface description file of each service includes a name of each service. The configuration file of each service includes a calling relationship between each service and a lower-level service of each service.

K2: Determine a calling relationship between the services based on the calling relationship between each service and the lower-level service of each service.

K3: Obtain a workload history of each service based on a name of each service, and determine, based on the workload history and the calling relationship between the services, a workload ratio corresponding to each calling relationship.

K4: Generate the application model based on the calling relationship between the services and the workload ratio corresponding to each calling relationship.

Figure 5:
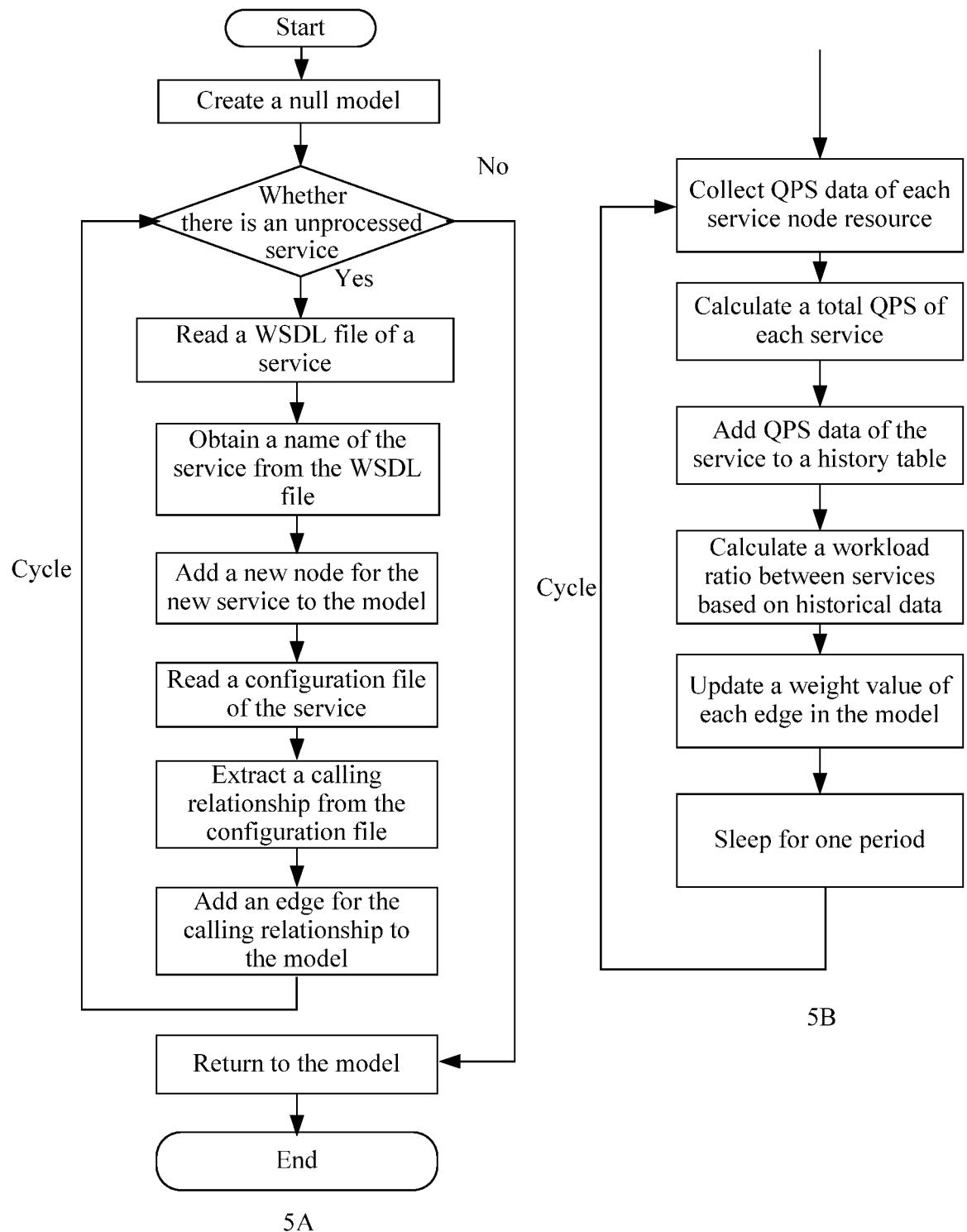
FIG. 5 is a schematic diagram of a specific implementation for generating an application model according to an embodiment of this application.

Steps K1 and K2 may be implemented according to a procedure in 5A in FIG. 5. In an embodiment, 5A in FIG. 5 is a schematic implementation flowchart of determining a calling relationship between all services in an application. It is assumed that a Web Services Description Language (WSDL) file in the application 1 is a service interface description file. First, the model generator 331 creates a null model and determines whether there is an unprocessed service. If there is an unprocessed service, the model generator 331 obtains a WSDL file of the service and extracts a name of the service from the WSDL file. Then, the model generator 331 adds a new node for the service to the model based on the name of the service, and obtains a configuration file (config file) of the service. Then, the model generator 331 extracts, from the config file, a calling relationship between the service and a lower-level service of the service, and adds an edge for each calling relationship to the model. When all services of the application are processed, the model generator 331 can determine the calling relationship between the services in the application model.

It should be noted that the calling relationship between the services can be confirmed after application development is completed, and is usually re-confirmed only after a service update of the application. The service update of the application includes adding a service or removing a service.

Steps K3 and K4 may be implemented according to a procedure in 5B in FIG. 5. In an embodiment, 5B in FIG. 5 is a schematic implementation flowchart of generating an application model based on a calling relationship between all services and a workload ratio. First, the model generator 331 obtains a workload history of each service. In this embodiment of this application, historical workload data is recorded by recording query per second (QPS) data of each service. Then, total QPS data of each service is calculated, and the total QPS data of each service is added to a history table. Then, a workload ratio between the services is calculated based on historical data. Finally, the workload ratio is updated to a weight value of an edge that corresponds to each of the calling relationship between the services. After the services of the application are processed, the model generator 331 generates the application model.

For example, it is assumed that for the application 1, QPS data is used to measure a processing capability of each instance of a service. It is assumed that a processing capability of each instance of the service A is 160 QPS, a processing capability of each instance of the service B is 300 QPS, a processing capability of each instance of the service C is 500 QPS, a processing capability of each instance of the service D is 500 QPS, and a processing capability of each instance of the service E is 800 QPS. Service interface description files of the service A, the service B, the service C, the service D, and the service E respectively include names of the service A, the service B, the service C, the service D, and the service E. A configuration file of the service A includes a calling relationship 1 between the service A and the service B and a calling relationship 2 between the service A and the service C. A configuration file of the service B includes a calling relationship 3 between the service B and the service D. A configuration file of the service C includes a calling relationship 4 between the service C and the service E. A configuration file of the service D includes a null calling relationship 5 of the service D. A configuration file of the service E includes a null calling relationship 6 of the service E. The model generator 331 may generate the application model in the following manner.

The model generator 331 first obtains the service interface description files of the service A, the service B, the service C, the service D, and the service E in the application 1 and the configuration files of the service A, the service B, the service C, the service D, and the service E.

Figure 6:
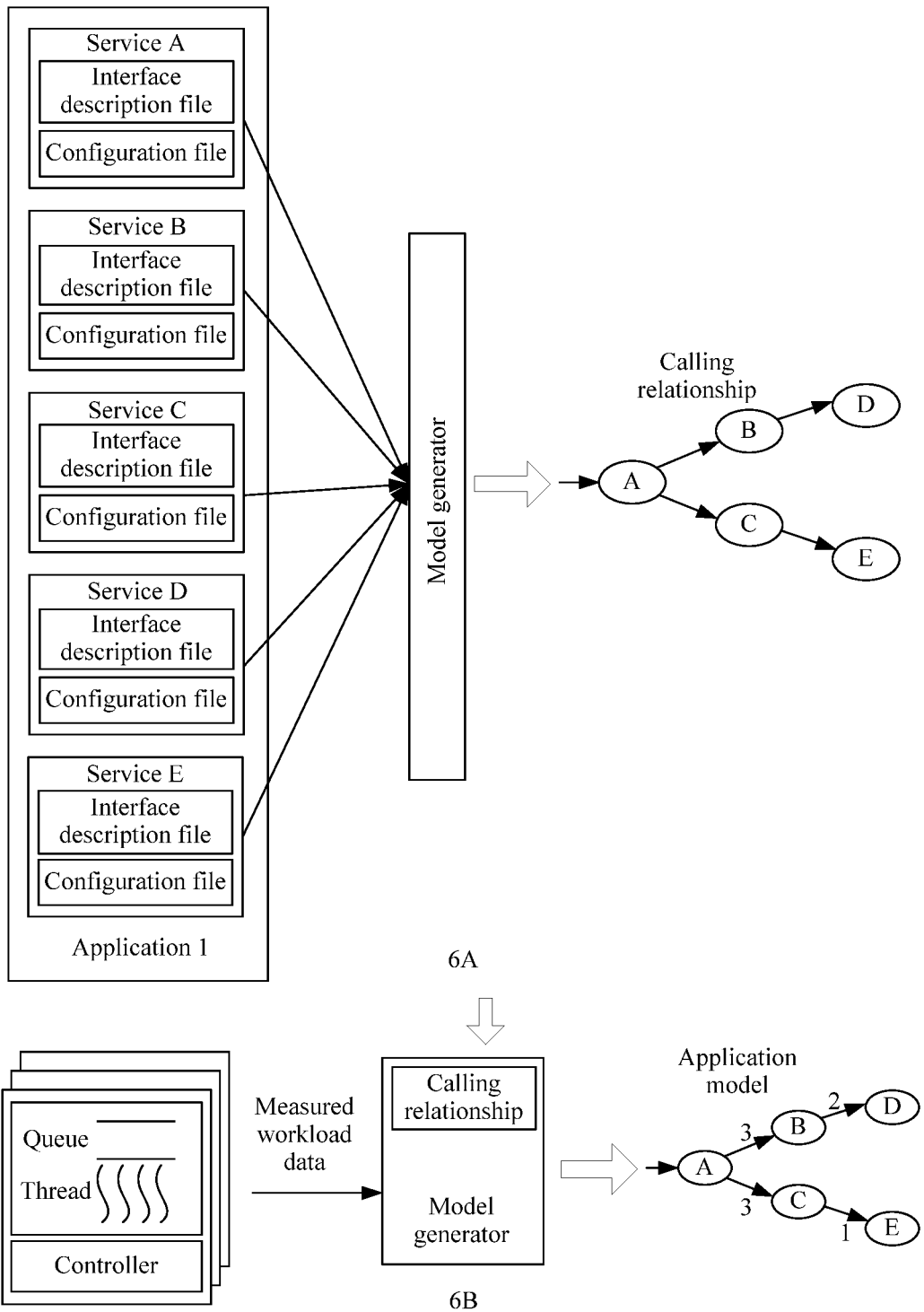
FIG. 6 is a schematic diagram of generating an application model according to an embodiment of this application.

Then, based on the method in 6A in FIG. 6, the model generator 331 may separately generate a node for the service A, the service B, the service C, the service D, and the service E based on the names in the service interface description files of the service A, the service B, the service C, the service D, and the service E, and generate an edge for each calling relationship based on the calling relationship 1, the calling relationship 2, the calling relationship 3, the calling relationship 4, the calling relationship 5, and the calling relationship 6 in the configuration files of the service A, the service B, the service C, the service D, and the service E, to obtain calling relationships shown in 6A in FIG. 6, that is, the service A calls the service B and the service C, the service B calls the service D, and the service C calls the service E.

Then, the model generator 331 obtains a workload history of each service in the application 1 based on the service name in the service interface description file of each service.

For example, it is assumed that Table 1 is a workload history 1 of the application 1 at a T1 moment. A workload history of each instance of each service at the T1 moment is shown in Table 1.

TABLE 1

|  | Service A | Service B | Service C | Service D | Service E |
| --- | --- | --- | --- | --- | --- |
| Instance | A1 = 100 QPS | B1 = 200 QPS | C1 = 200 QPS | D1 = 300 QPS | E1 = 300 QPS |
| Instance | A2 = 100 QPS | B2 = 200 QPS | C2 = 200 QPS | D2 = 300 QPS | E2 = 300 QPS |
| Instance |  | B3 = 200 QPS | C3 = 200 QPS | D3 = 300 QPS |  |
| Instance |  |  |  | D4 = 300 QPS |  |

According to Table 1, a total workload of the application 1 on each service at the T1 moment is service A—200 QPS, service B—600 QPS, service C—600 QPS, service D—1200 QPS, and service E—600 QPS.

The total workload on each service at the T1 moment is added to a history table, as shown in Table 2.

TABLE 2

| Time | Service A | Service B | Service C | Service D | Service E |
| --- | --- | --- | --- | --- | --- |
| T1 | 200 QPS | 600 QPS | 600 QPS | 1200 QPS | 600 QPS |

It is assumed that Table 3 is a workload history 2 of the application 1 at a T2 moment. A workload history of each instance of each service at the T2 moment is shown in Table 3.

TABLE 3

|  | Service A | Service B | Service C | Service D | Service E |
| --- | --- | --- | --- | --- | --- |
| Instance | A1 = 150 QPS | B1 = 300 QPS | C1 = 300 QPS | D1 = 450 QPS | E1 = 450 QPS |
| Instance | A2 = 150 QPS | B2 = 300 QPS | C2 = 300 QPS | D2 = 450 QPS | E2 = 450 QPS |
| Instance |  | B3 = 300 QPS | C3 = 300 QPS | D3 = 450 QPS |  |
| Instance |  |  |  | D4 = 450 QPS |  |

According to Table 3, a total workload of the application 1 on each service at the T2 moment is service A—300 QPS, service B—900 QPS, service C—900 QPS, service D—1800 QPS, and service E—900 QPS.

It can be seen from Table 1 and Table 3 that at the T1 moment and the T2 moment, the service A includes two instances A1 and A2. The service B includes three instances B1, B2, and B3. The service C includes three instances C1, C2, and C3. The service D includes four instances D1, D2, D3, and D4. The service E includes two instances E1 and E2.

The total workload on each service at the T2 moment is added to the history table, as shown in Table 4.

TABLE 4

| Time | Service A | Service B | Service C | Service D | Service E |
| --- | --- | --- | --- | --- | --- |
| T1 | 200 QPS | 600 QPS | 600 QPS | 1200 QPS | 600 QPS |
| T2 | 300 QPS | 900 QPS | 900 QPS | 1800 QPS | 900 QPS |

An average QPS ratio between each two services that have a calling relationship is calculated based on Table 4 service B/service A=(900+600)/(200+300)=3, service C/service A=(900+600)/(200+300)=3, service D/service B=(1200+1800)/(900+600)=2, and service E/service C=(600+900)/(900+600)=1. Therefore, workload ratios corresponding to the calling relationships are BA=3, CA=3, DB=2, and EC=1, respectively. The workload ratios corresponding to the calling relationships are used as weights of edges that have calling relationships in 6A in FIG. 6, to obtain an application model shown in 6B in FIG. 6.

It should be noted that in this embodiment of this application, only the workload records at the T1 moment and at the T2 moment are used as an example for description, and in an embodiment, the workload ratio corresponding to the calling relationship in the application model may be determined based on a workload record in a customized period. This is not specifically limited in this embodiment of this application. In addition, in this embodiment of this application, that the workload ratio between services is calculated using an averaging method is merely an example, and in an embodiment, the workload ratio between services may be analyzed using other mathematical methods. This is not further limited in this embodiment of this application.

It should be noted that in this embodiment of this application, an example in which both the service A and the service E have two instances, both the service B and the service C have three instances, and the service D has four instances is used for description. Certainly, processing capabilities of instances on each service may be the same or different, and quantities of instances on various services may be the same or different. This is not further limited in this embodiment of this application.

According to the method for generating an application model provided in this embodiment of this application, the calling relationship between the services of the application is determined based on the service interface description file of the service and the configuration file of the service, and the application model of the application is determined based on the calling relationship between the services and by calculating the workload ratio corresponding to each calling relationship. In other words, the application model can represent the calling relationship between the services of the application and the workload ratio corresponding to the calling relationship. Therefore, a capacity expansion apparatus can predict a predicted workload of any service of the application based on the application model of the application to obtain predicted workloads of all target services, and can further perform capacity expansion simultaneously on all the target services based on the predicted workloads of all the target services, thereby improving a capacity expansion efficiency. Further, this can rapidly improve overall performance of the application within a short period, and further guarantees Service Level Agreement (SLA) indicators promised to customers such as application reliability, throughput, and response delay.

In an embodiment, with reference to FIG. 3, the model generator 331 is configured to support execution of steps K1 to K4 in this embodiment of this application.

In an embodiment, actions in steps K1 to K4 may be executed by invoking, by the processor 401 of the computer device 400 shown in FIG. 4, the application program code that is stored in the memory 403. This is not limited in this embodiment of this application.

Optionally, considering that the application service is dynamically changing, to more accurately describe a relationship between services of the application, the model updater 332 may be used to update the application model. The following provides three specific manners for updating an application model.

A first manner for updating an application model includes steps M1 to M3.

M1: Obtain the workload history of each service based on the name of each service.

M2: Update, based on the workload history and each calling relationship, the workload ratio corresponding to each calling relationship.

M3: Update the application model based on each calling relationship and an updated workload ratio corresponding to each calling relationship.

For example, it is assumed that Table 5 is a workload history 3 of the application 1 at a T3 moment. A workload history of each instance of each service at the T3 moment is shown in Table 5.

TABLE 5

|  | Service A | Service B | Service C | Service D | Service E |
|---|---|---|---|---|---|
| Instance | A1 = 90 QPS | B1 = 220 QPS | C1 = 350 QPS | D1 = 360 QPS | E1 = 650 QPS |
| Instance | A2 = 110 QPS | B2 = 250 QPS | C2 = 480 QPS | D2 = 390 QPS | E2 = 650 QPS |
| Instance |  | B3 = 230 QPS | C3 = 470 QPS | D3 = 300 QPS |  |
| Instance |  |  |  | D4 = 350 QPS |  |

It can be learned from Table 5 that a total workload of the application 1 on each service at the T3 moment is service A—200 QPS, service B—700 QPS, service C—1300 QPS, service D—1400 QPS, and service E—1300 QPS.

The total workload on each service at the T3 moment is added to the history table, as shown in Table 6.

TABLE 6

| Time | Service A | Service B | Service C | Service D | Service E |
|---|---|---|---|---|---|
| T1 | 200 QPS | 600 QPS | 600 QPS | 1200 QPS | 600 QPS |
| T2 | 300 QPS | 900 QPS | 900 QPS | 1800 QPS | 900 QPS |
| T3 | 200 QPS | 700 QPS | 1300 QPS | 1400 QPS | 1300 QPS |

An average QPS ratio between each two services that have a calling relationship is calculated based on Table 6 service B/service A=(900+600+700)/(200+300+200)=3, service C/service A=(900+600+1300)/(200+300+200)=4, service D/service B=(1200+1800+1400)/(900+600+700)=2, and service E/service C (600+900+1300)/(900+600+1300)=1. Therefore, workload ratios corresponding to the calling relationships are BA=3, CA=4, DB=2, and EC=1, respectively. The workload ratios corresponding to the calling relationships are used as weights of edges that have calling relationships in 6B in FIG. 6, to obtain an application model shown in FIG. 7.

According to the method for updating an application model provided in this embodiment of this application, the workload ratio corresponding to each calling relationship in the application model is updated based on the obtained workload history of each service such that the application model can more accurately reflect a change in the workload ratio between services, and when capacity expansion is required, capacity expansion can be performed rapidly and a more accurate instance to be expanded can be obtained. This guarantees SLA indicators such as application reliability, throughput, and response delay.

In an embodiment, with reference to FIG. 3, the model updater 332 is configured to perform steps M1 to M3 in this embodiment of this application.

In an embodiment, actions in steps M1 to M3 may be executed by invoking, by the processor 401 of the computer device 400 shown in FIG. 4, the application program code that is stored in the memory 403. This is not limited in this embodiment of this application.

A second manner for updating an application model includes steps W1 to W5.

W1: If a third service is added to an updated application, obtain a service interface description file of the third service, a configuration file of the third service, and an updated configuration file of each of at least one fourth service.

The service interface description file of the third service includes a name of the third service. The configuration file of the third service includes a third calling relationship between the third service and each of at least one fifth service. The updated configuration file of each fourth service includes a fourth calling relationship between each fourth service and the third service. The fourth service is an upper-level service of the third service. The fifth service is a lower-level service of the third service.

W2: Update the calling relationship between the services based on the application model, the third calling relationship, and the fourth calling relationship.

W3: Obtain a workload history of each of all services of the updated application based on a name of each of the services of the updated application.

W4: Determine, based on the workload history of each of the services of the updated application and an updated calling relationship between the services, a workload ratio corresponding to each of the updated calling relationship between the services.

W5: Update the application model of the application based on the updated calling relationship between the services and the workload ratio corresponding to each of the updated calling relationship between the services.

For example, it is assumed that a service F is added to the application 1, a service interface description file of the service F includes a name of the service F, a configuration file of the service F includes a calling relationship 7 between the service F and the service E, and the service F does not call another service.

Figure 7:
FIG. 7 is a schematic diagram of updating an application model according to an embodiment of this application.

The model updater 332 updates, in the foregoing manner based on the calling relationship in the application model shown in 6A in FIG. 6 and the calling relationship 7, the calling relationship in the application model shown in 6A in FIG. 6 to a calling relationship of the application 1 shown in FIG. 7.

It is assumed that Table 7 is a workload history 4 of the application 1 at a T4 moment. A workload history of each instance of each service at the T4 moment is shown in Table 7.

TABLE 7

|  | Service A | Service B | Service C | Service D | Service E | Service F |
|---|---|---|---|---|---|---|
| Instance | A1 = 100 QPS | B1 = 200 QPS | C1 = 200 QPS | D1 = 300 QPS | E1 = 300 QPS | F1 = 600 QPS |
| Instance | A2 = 100 QPS | B2 = 200 QPS | C2 = 200 QPS | D2 = 300 QPS | E2 = 300 QPS |  |
| Instance |  | B3 = 200 QPS | C3 = 200 QPS | D3 = 300 QPS |  |  |
| Instance |  |  |  | D4 = 300 QPS |  |  |

It can be learned from Table 7 that a total workload of the application 1 on each service at the T4 moment is service A—200 QPS, service B—600 QPS, service C—600 QPS, service D—1200 QPS, service E—600 QPS, and service F—600 QPS.

The total workload on each service at the T4 moment is added to the history table, as shown in Table 8.

TABLE 8

| Time | Service A | Service B | Service C | Service D | Service E | Service F |
|---|---|---|---|---|---|---|
| T1 | 200 QPS | 600 QPS | 600 QPS | 1200 QPS | 600 QPS |  |
| T2 | 300 QPS | 900 QPS | 900 QPS | 1800 QPS | 900 QPS |  |
| T3 | 200 QPS | 700 QPS | 1300 QPS | 1400 QPS | 1300 QPS |  |
| T4 | 200 QPS | 600 QPS | 600 QPS | 1200 QPS | 600 QPS | 600 QPS |

Figure 8:
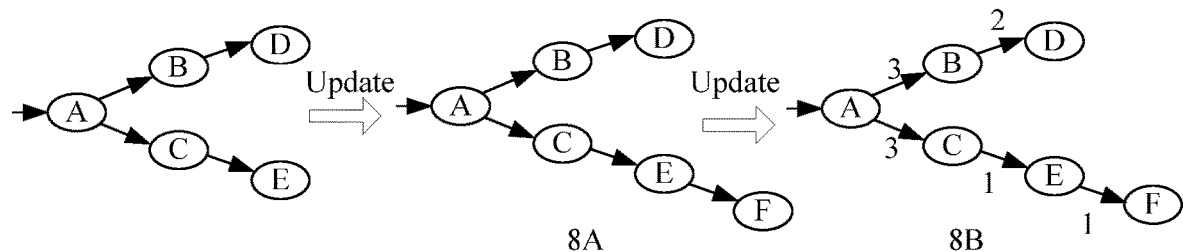
FIG. 8 is another schematic diagram of updating an application model according to an embodiment of this application.

An average QPS ratio, at the T4 moment, between each two services that have a calling relationship is calculated based on Table 8 service B/service A=(200+200+200)/(100+100)=3, service C/service A=(200+200+200)/(100+100)=3, service D/service B=(300+300+300+300)/(200+200+200)=2, service E/service C=(300+300)/(200+200+200)=1, and service F/service E=(600)/(300+300)=1. Therefore, workload ratios corresponding to the calling relationships are BA=3, CA=3, DB=2, EC=1, and FE=1. The workload ratios corresponding to the calling relationships are used as weights of edges that have calling relationships in 8A in FIG. 8, to obtain an application model shown in 8B in FIG. 8.

It should be noted that in this embodiment of this application, for the sake of simplicity, after a service is added to the application, a workload history at only one moment is merely used for illustration purposes. In an embodiment, after the application is updated, a plurality of workload histories may be obtained depending on a requirement, to update the application model more accurately, and the workload ratio corresponding to each calling relationship may be obtained using another algorithm. This is not further limited in this embodiment of this application. In addition, for ease of understanding, in this embodiment of this application, updated historical workload data is recorded in a same history table, and in an embodiment, after the application is updated, a new history table may be created to record the updated historical workload data. This is not further limited in this embodiment of this application.

It should be noted that when a service is added to the application, an upper-level service that calls the service and a lower-level service that is called by the service update calling relationships in configuration files.

According to the method for updating a model provided in this embodiment of this application, all calling relationships and workload ratios of the application are updated when a service is added to the application such that the application model can more accurately reflect a change in the calling relationship and the workload ratio after the application is updated, and when capacity expansion is required, capacity expansion can be performed rapidly and a more accurate instance to be expanded can be obtained. This guarantees SLA indicators such as application reliability, throughput, and response delay.

In an embodiment, with reference to FIG. 3, the model updater 332 is configured to perform steps W1 to W5 in this embodiment of this application.

In an embodiment, actions in steps W1 to W5 may be executed by invoking, by the processor 401 of the computer device 400 shown in FIG. 4, the application program code that is stored in the memory 403. This is not limited in this embodiment of this application.

A third manner for updating an application model includes steps P1 to P5.

P1: If a sixth service is deleted from the updated application, obtain an updated configuration file of each of at least one seventh service.

Before the sixth service is deleted from the application, the seventh service is an upper-level service of the sixth service. After the sixth service is deleted from the application, the updated configuration file of each seventh service includes a fifth calling relationship between each seventh service and at least one eighth service. The eighth service is a lower-level service of the seventh service.

P2: Update the calling relationship between the services based on the application model and the fifth calling relationship.

P3: Obtain a workload history of each of all services of the updated application based on a name of each of the services of the updated application.

P4: Determine, based on the workload history of each of the services of the updated application and an updated calling relationship between the services, a workload ratio corresponding to each of the updated calling relationship between the services.

P5: Update the application model of the application based on the updated calling relationship between the services and the workload ratio corresponding to each of the updated calling relationship between the services.

For example, it is assumed that the service C is deleted from the application 1, and a calling relationship 8 between the service A and the service E is updated to the configuration file of the service A.

Figure 9:
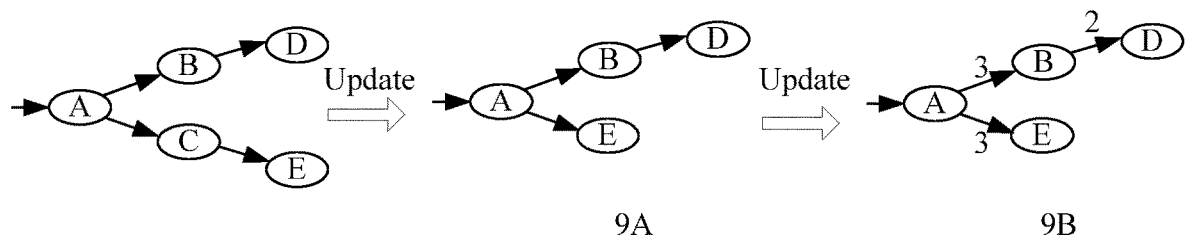
FIG. 9 is another schematic diagram of updating an application model according to an embodiment of this application.

The model updater 332 updates, in the foregoing manner based on the calling relationship in the application model shown in 6A in FIG. 6 and the calling relationship 8, the calling relationship in the application model shown in 6A in FIG. 6 to a calling relationship of the application 1 shown in 9A in FIG. 9.

It is assumed that Table 9 is a workload history 5 of the application 1 at a T5 moment. A workload history of each instance of each service at the T5 moment is shown in Table 9.

TABLE 9

|  | Service A | Service B | Service D | Service E |
|---|---|---|---|---|
| Instance | A1 = 100 QPS | B1 = 200 QPS | D1 = 300 QPS | E1 = 300 QPS |
| Instance | A2 = 100 QPS | B2 = 200 QPS | D2 = 300 QPS | E2 = 300 QPS |
| Instance |  | B3 = 200 QPS | D3 = 300 QPS |  |
| Instance |  |  | D4 = 300 QPS |  |

It can be learned from Table 9 that a total workload of the application 1 on each service at the T5 moment is service A—200 QPS, service B—600 QPS, service D—1200 QPS, and service E—600 QPS.

The total workload on each service at the T5 moment is added to the history table, as shown in Table 10.

TABLE 10

| Time | Service A | Service B | Service C | Service D | Service E | Service F |
|---|---|---|---|---|---|---|
| T1 | 200 QPS | 600 QPS | 600 QPS | 1200 QPS | 600 QPS |  |
| T2 | 300 QPS | 900 QPS | 900 QPS | 1800 QPS | 900 QPS |  |
| T3 | 200 QPS | 700 QPS | 1300 QPS | 1400 QPS | 1300 QPS |  |
| T4 | 200 QPS | 600 QPS | 600 QPS | 1200 QPS | 600 QPS | 600 QPS |
| T5 | 200 QPS | 600 QPS |  | 1200 QPS | 600 QPS |  |

According to Table 10, workload ratios corresponding to calling relationships of the application 1 at the T5 moment are service B/service A=(200+200+200)/(100+100)=3, service D/service B=(300+300+300+300)/(200+200+200)=2, and service E/service A=(300+300)/(100+100)=3, respectively. Therefore, the workload ratios corresponding to the calling relationships are BA=3, DB=2, and EA=3, respectively. The workload ratios corresponding to the calling relationships are used as weights of edges that have calling relationships in 9A in FIG. 9, to obtain an application model shown in 9B in FIG. 9.

It should be noted that when a service is deleted from the application, the model generator deletes a name of the service and a corresponding calling relationship from the application mode.

It should be noted that in this embodiment of this application, for the sake of simplicity, after the service is deleted from the application, a workload history at only one moment is merely used for illustration purposes. In an embodiment, after the application is updated, a plurality of workload histories may be obtained depending on a requirement, to update the application model more accurately, and the workload ratio corresponding to each calling relationship may be obtained using another algorithm. This is not further limited in this embodiment of this application.

According to the method for updating a model provided in this embodiment of this application, all calling relationships and workload ratios of the application are updated when a service is deleted from the application such that the application model can more accurately reflect a change in the calling relationship and the workload ratio after the application is updated, and when capacity expansion is required, capacity expansion can be performed rapidly and a more accurate instance to be expanded can be obtained. This guarantees SLA indicators such as application reliability, throughput, and response delay.

In an embodiment, with reference to FIG. 3, the model updater 332 in the capacity expansion apparatus 300 is configured to support the capacity expansion apparatus 300 in performing steps P1 to P5 in this embodiment of this application.

In an embodiment, actions in steps P1 to P5 may be executed by invoking, by the processor 401 of the computer device 400 shown in FIG. 4, the application program code that is stored in the memory 403. This is not limited in this embodiment of this application.

It should be noted that the three manners for updating an application model in this embodiment of this application are independent of each other. Updating may be performed when a service is added after another service is deleted, updating may be performed when a service is deleted after another service is added, or updating may be performed when a service is deleted or added only after a workload ratio is updated. This is not further limited in this embodiment of this application. According to the method provided in this embodiment of this application, the application model of the application is updated based on the updated workload history and the updated calling relationship between the services, to obtain a more accurate application model such that the application can perform capacity expansion rapidly and obtain a more accurate instance to be expanded. This guarantees SLA indicators such as application reliability, throughput, and response delay.

Figure 10:
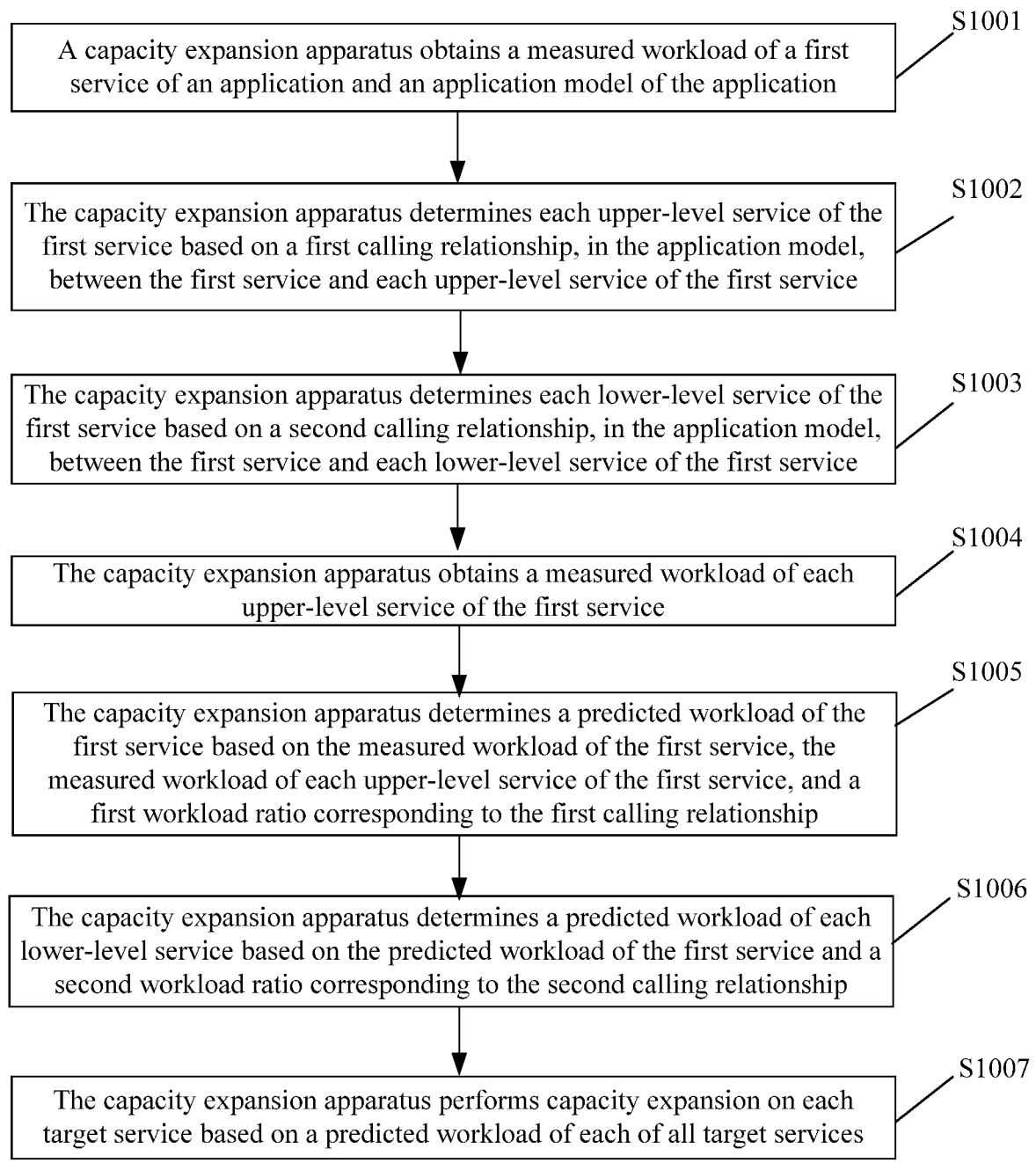
FIG. 10 is a schematic flowchart of a capacity expansion method according to an embodiment of this application.

The following describes in detail the capacity expansion method provided in the embodiments of this application with reference to the capacity expansion apparatus shown in FIG. 3. As shown in FIG. 10, FIG. 10 is a flowchart of a capacity expansion method according to an embodiment of this application. The method includes steps S1001 to S1007.

S1001: The capacity expansion apparatus obtains a measured workload of a first service of an application and an application model of the application.

The application model includes a calling relationship between all services of the application and a workload ratio corresponding to each of the calling relationship. The first service is any one of the services.

It should be noted that the measured workload provided in this embodiment of this application includes a workload currently being processed by the service and a workload waiting to be processed in a queue of the service.

S1002: The capacity expansion apparatus determines each upper-level service of the first service based on a first calling relationship, in the application model, between the first service and each upper-level service of the first service.

S1003: The capacity expansion apparatus determines each lower-level service of the first service based on a second calling relationship, in the application model, between the first service and each lower-level service of the first service.

S1004: The capacity expansion apparatus obtains a measured workload of each upper-level service of the first service.

S1005: The capacity expansion apparatus determines a predicted workload of the first service based on the measured workload of the first service, the measured workload of each upper-level service of the first service, and a first workload ratio corresponding to the first calling relationship.

S1006: The capacity expansion apparatus determines a predicted workload of each lower-level service based on the predicted workload of the first service and a second workload ratio corresponding to the second calling relationship.

S1007: The capacity expansion apparatus performs capacity expansion on each target service based on a predicted workload of each of all target services.

The target service includes the first service and each lower-level service of the first service.

According to the capacity expansion method provided in this embodiment of this application, capacity expansion is performed based on the application model. The application model can represent the calling relationship between the services of the application and the workload ratio corresponding to the calling relationship, and therefore the capacity expansion apparatus can predict a predicted workload of any service of the application based on the application model of the application to obtain predicted workloads of all target services, and can further perform capacity expansion simultaneously on all the target services based on the predicted workloads of all the target services. Compared with the other approaches that capacity expansion can only be performed on services level by level, this improves a capacity expansion efficiency, can rapidly improve overall performance of the application within a short period, and further guarantees SLA indicators such as application reliability, throughput, and response delay.

In an embodiment, with reference to FIG. 3, the workload estimator 320 of the capacity expansion apparatus 300 is configured to support the capacity expansion apparatus 300 in performing steps S1001 to S1006 in this embodiment of this application, the scaling controller 310 of the capacity expansion apparatus 300 is configured to support the capacity expansion apparatus 300 in performing step S1007 in this embodiment of this application.

In an embodiment, actions in steps S1001 to S1007 may be executed by invoking, by the processor 401 of the computer device 400 shown in FIG. 4, the application program code that is stored in the memory 403. This is not limited in this embodiment of this application.

In a possible implementation, step S1005 includes determining, by the capacity expansion apparatus, the predicted workload of each target service according to formula (1).

$$f(v_i) = \max(d(v_i), \Sigma_{k \in K} f(k) * e_{ki}) \qquad \text{formula (1)},$$

where V indicates a set of the services of the application, K indicates a set of upper-level services i of a service i of the application, K∈V, $v_i$ indicates the service i, $d(v_i)$ indicates a measured workload of the service i, f(k) indicates a measured workload of the upper-level service k of the service i, $e_{ki}$ indicates a workload ratio between the service k and the service i, and the service i is any one of the services.

This embodiment of this application provides a specific implementation for determining the predicted workload of the first service. $\Sigma_{k \in K} f(k) * e_{ki}$ indicates a workload of the service i that is calculated based on f(k) and $e_{ki}$, $\max(d(v_i), \Sigma_{k \in K} f(k) * e_{ki})$ indicates that a larger value of $\Sigma_{k \in K} f(k) * e_{ki}$ and $d(v_i)$ is determined as a predicted workload of the service i. Two factors, that is, the measured workload of the first service and a workload of the first service that is determined based on the measured workload of the upper-level service of the first service, are considered, and therefore a more accurate predicted workload of the first service can be obtained, and a more accurate quantity of instances to be expanded can be obtained. This can further guarantees SLA indicators such as application reliability, throughput, and response delay.

Figure 11:
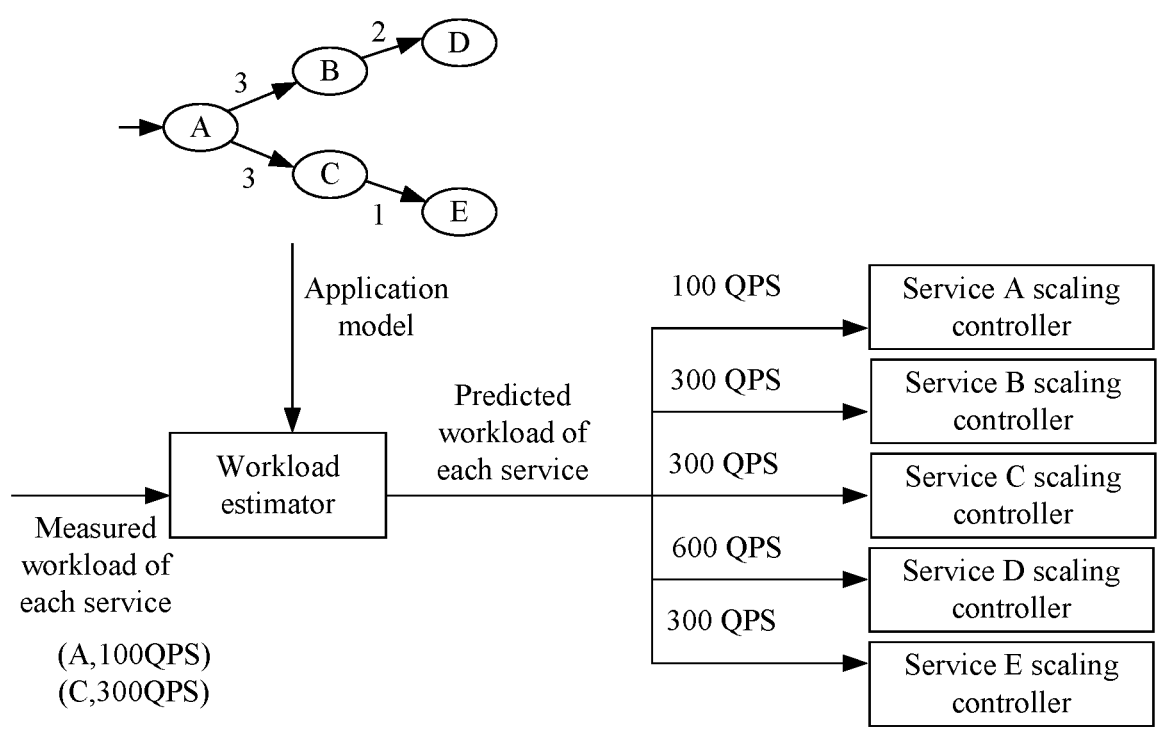
FIG. 11 is a schematic flowchart of predicting a workload according to an embodiment of this application.

FIG. 11 is a schematic flowchart of predicting a workload according to an embodiment of this application. As shown in FIG. 11, the workload estimator 320 receives the application model and workload information (A,100 QPS) and (C,300 QPS) sent by a controller of each service, the workload estimator 320 may calculate, based on the application model, that predicted workload values of the service A, the service B, the service C, the service D, and the service E are 100 QPS, 300 QPS, 300 QPS, 600 QPS, and 300 QPS, respectively and send the predicted workload values to the scaling controllers 310 of the services, and the scaling controller 310 predicts a quantity of instances of each service based on the workload to perform capacity expansion simultaneously on the plurality of services of the application.

Figure 12:
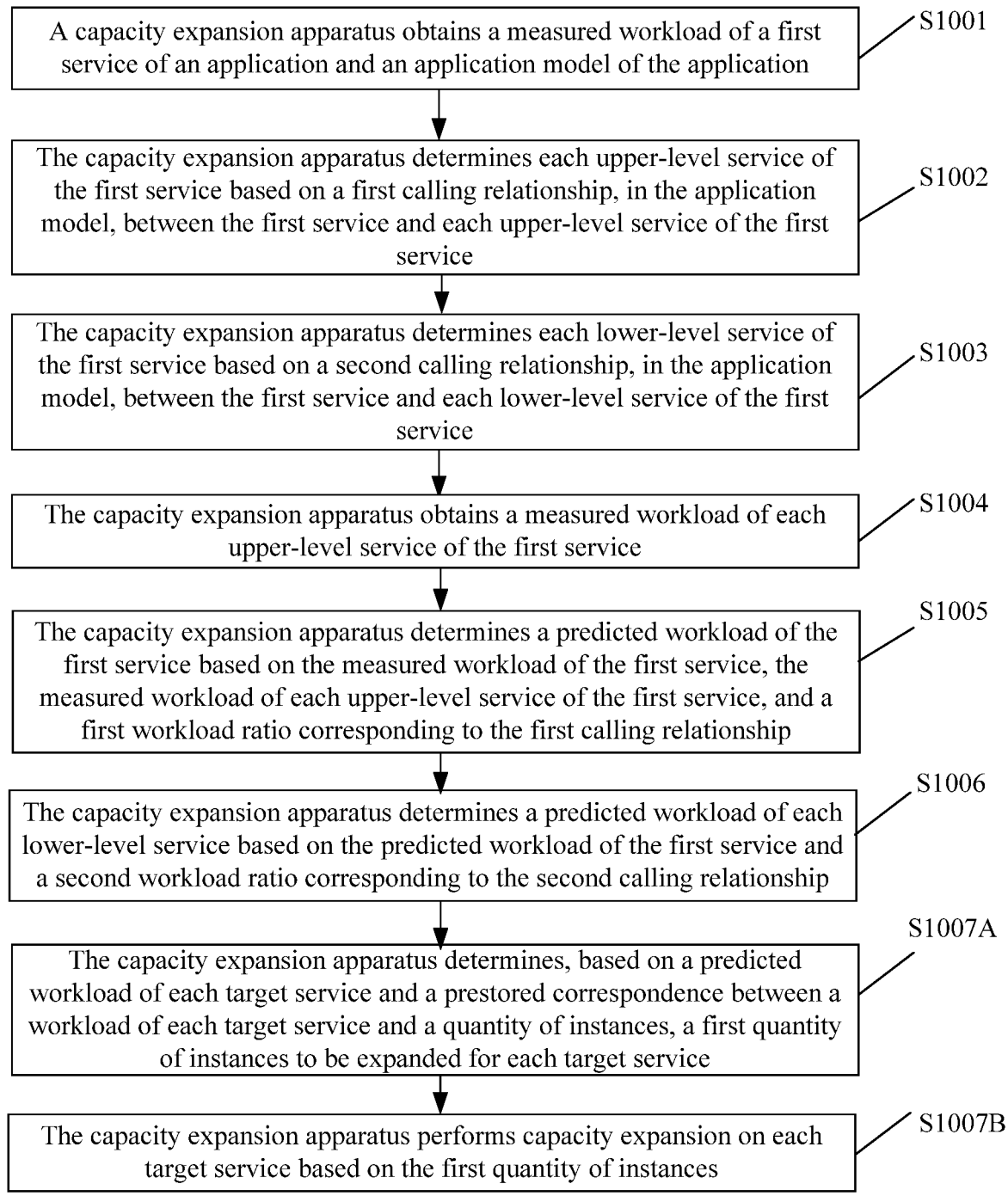
FIG. 12 is a schematic flowchart of another capacity expansion method according to an embodiment of this application.

In a possible implementation, as shown in FIG. 12, step S1007 includes steps S1007A and S1007B.

S1007A: The capacity expansion apparatus determines, based on the predicted workload of each target service and a restored correspondence between a workload of each target service and a quantity of instances, a first quantity of instances to be expanded for each target service.

S1007B: The capacity expansion apparatus performs capacity expansion on each target service based on the first quantity of instances.

According to the capacity expansion method provided in this embodiment of this application, the predicted workload and the restored correspondence between the workload and the quantity of instances are compared, to more accurately determine a quantity of instances to be expanded such that capacity expansion can be performed rapidly for the application and a more accurate instance to be expanded is obtained. This guarantees SLA indicators such as application reliability, throughput, and response delay.

In an embodiment, with reference to FIG. 3, the scaling controller 310 of the capacity expansion apparatus 300 is configured to support the capacity expansion apparatus 300 in performing steps S1007A and S1007B in this embodiment of this application.

In an embodiment, actions in steps S1007A and S1007B may be executed by invoking, by the processor 401 of the computer device 400 shown in FIG. 4, the application program code that is stored in the memory 403. This is not limited in this embodiment of this application.

Figure 13A:
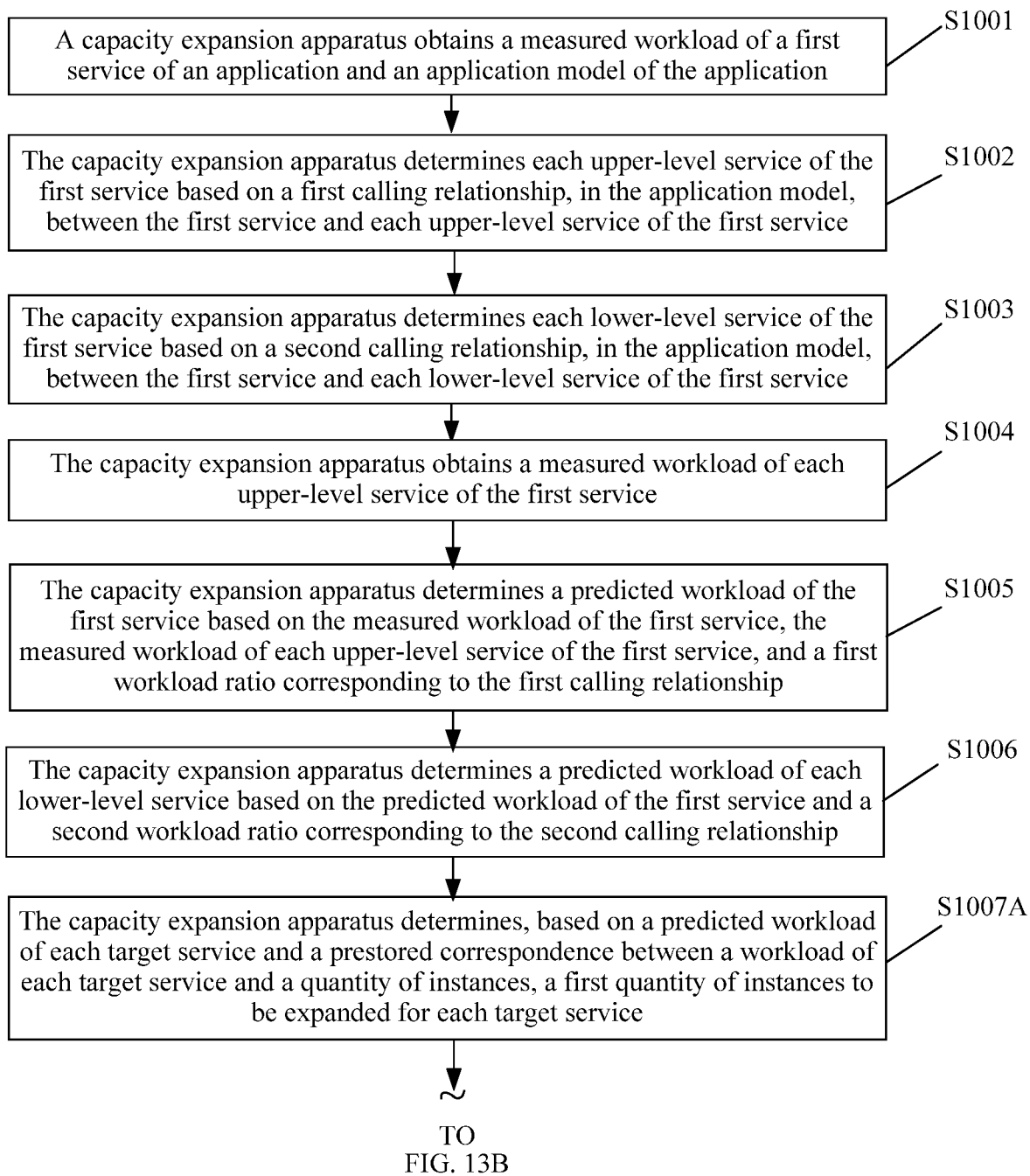
FIG. 13A and FIG. 13B are a schematic flowchart of another capacity expansion method according to an embodiment of this application.
Figure 13B:
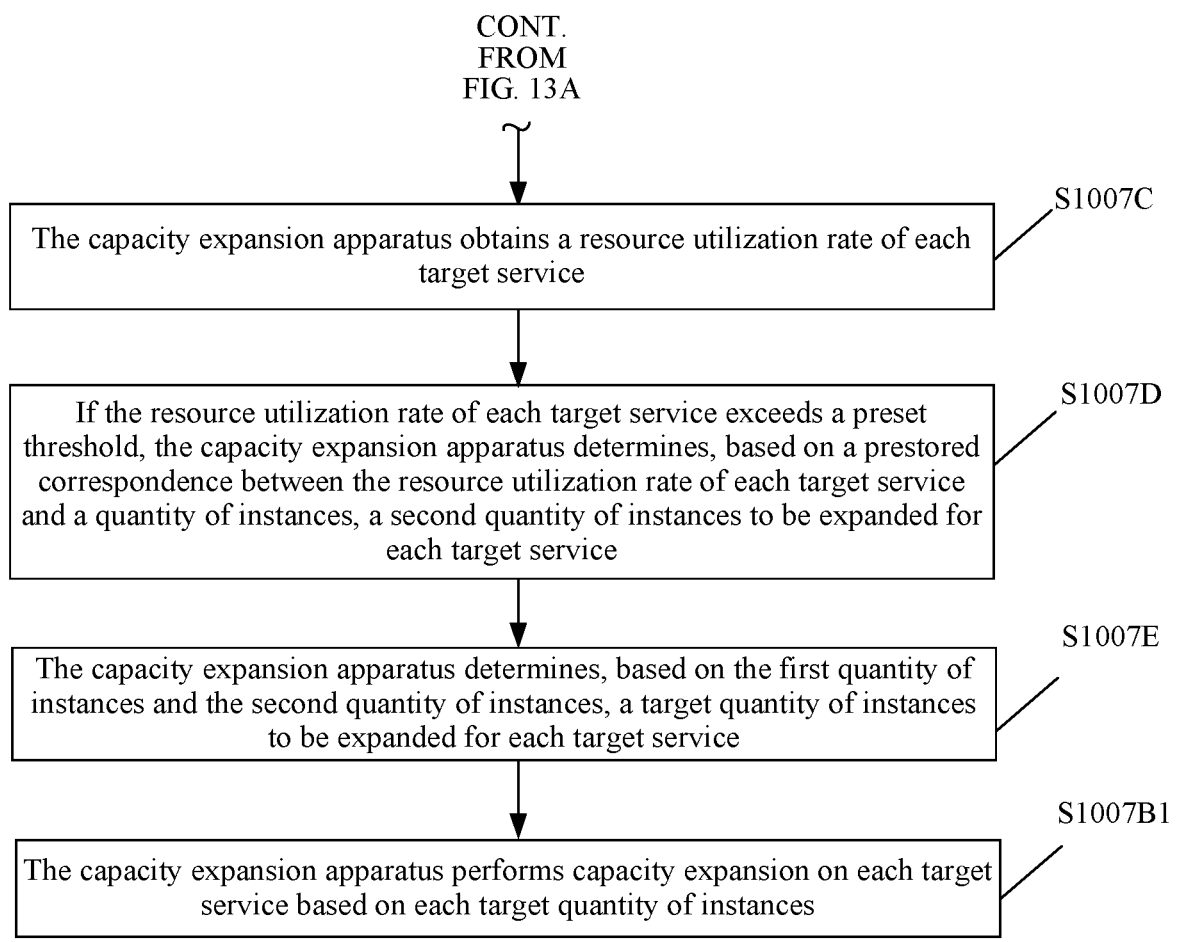

In a possible implementation, as shown in FIG. 13B, before step S1007B, the method further includes steps S1007C to S1007E, and step S1007B includes step S1007B1.

S1007C: The capacity expansion apparatus obtains a resource utilization rate of each target service.

S1007D: If the resource utilization rate of each target service exceeds a preset threshold, the capacity expansion apparatus determines, based on a restored correspondence between the resource utilization rate of each target service and a quantity of instances, a second quantity of instances to be expanded for each target service.

S1007E: The capacity expansion apparatus determines, based on the first quantity of instances and the second quantity of instances, a target quantity of instances to be expanded for each target service.

S1007B1: The capacity expansion apparatus performs capacity expansion on each target service based on each target quantity of instances.

According to the capacity expansion method provided in this embodiment of this application, when capacity expansion is performed on the application, a quantity of instances that is obtained based on a resource utilization rate can be determined based on a resource utilization rate of each service, and a more accurate target quantity of instances to be expanded can be obtained based on the quantity of instances that is determined based on the predicted workload and the quantity of instances that is obtained based on the resource utilization rate such that capacity expansion can be performed rapidly for the application based on a more accurate instance to be expanded. This guarantees SLA indicators such as application reliability, throughput, and response delay.

In an embodiment, with reference to FIG. 3, the scaling controller 310 of the capacity expansion apparatus 300 is configured to support the capacity expansion apparatus 300 in performing steps S1007C to S1007E and step S1007B1 in this embodiment of this application.

In an embodiment, actions in steps S1007C to S1007E and step S1007B1 may be executed by invoking, by the processor 401 of the computer device 400 shown in FIG. 4, the application program code that is stored in the memory 403. This is not limited in this embodiment of this application.

Figure 14:
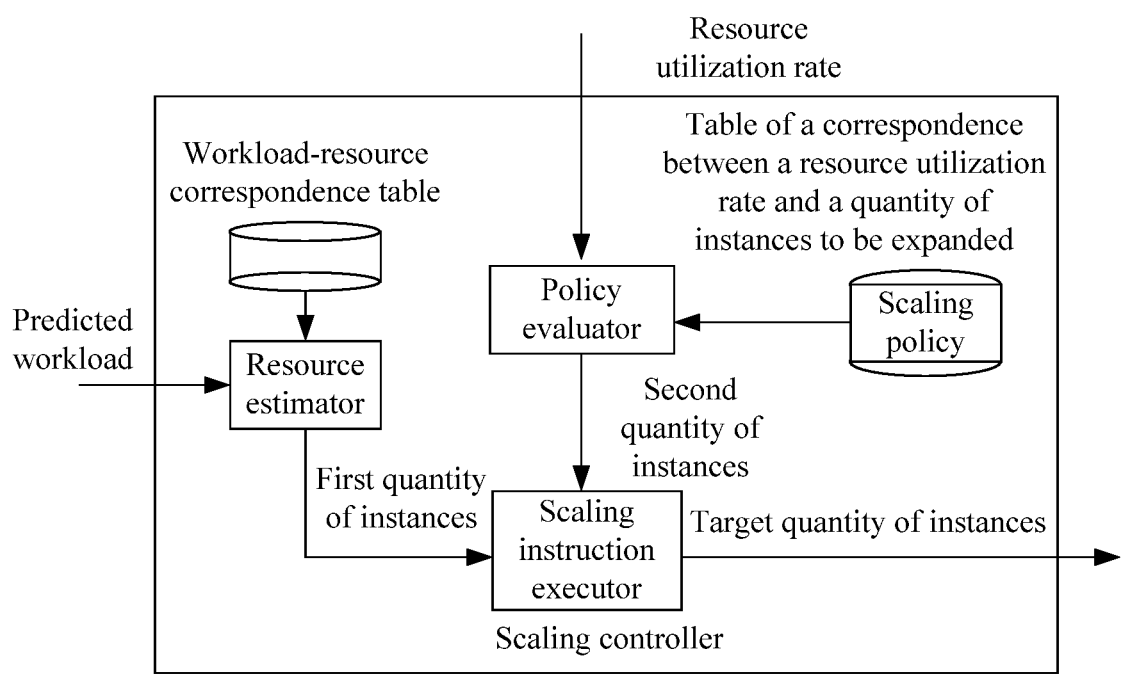
FIG. 14 is an internal structure diagram of a scaling controller according to an embodiment of this application.

As shown in FIG. 14, FIG. 14 is an internal structure diagram of a scaling controller according to an embodiment of this application. The internal structure includes a workload-resource correspondence table, a resource estimator, a policy evaluator, a scaling policy file, and a scaling instruction executor. The scaling controller may perform, based on the capability expansion method provided in the embodiments of this application, capacity expansion on a service corresponding to the scaling controller. The workload-resource correspondence table and a scaling policy may be a file or a small database. The correspondence between a workload and a quantity of instances is stored in the workload-resource correspondence table. A table of a correspondence between a resource utilization rate and a quantity of instances is stored in the scaling policy file. Input of the scaling controller includes a predicted workload and a resource utilization rate of the service. When the input is the predicted workload, the resource estimator of the scaling controller queries the workload-resource correspondence table to estimate the required first quantity of instances. When the input is the resource utilization rate of the service, the policy evaluator evaluates the correspondence, in the scaling policy, between the resource utilization rate and the quantity of instances to determine the second quantity of instances, and sends the second quantity of instances to the scaling instruction executor. The scaling instruction executor determines which one of the two quantities of instances to be expanded obtained by the resource estimator and the policy evaluator is greater, uses the larger quantity of instances as the target quantity of instances, and performs capacity expansion based on the target quantity of instances.

It should be noted that capacity expansion in this embodiment of this application may be increasing a quantity of instances or may be reducing a quantity of instances. This is not further limited in this embodiment of this application.

In this embodiment of this application, two manners are used to determine the target quantity of instances to be expanded such that application capacity expansion triggered by a plurality of conditions can be implemented. Target quantities of instances determined in two different manners are compared such that a more accurate quantity of instances to be expanded can be obtained while capacity expansion is performed rapidly. Therefore, capacity expansion can be performed rapidly for the application and a more accurate instance to be expanded can be obtained. This guarantees SLA indicators such as application reliability, throughput, and response delay.

In an embodiment, with reference to FIG. 3, the scaling controller 310 of the capacity expansion apparatus 300 is configured to support the capacity expansion apparatus 300 in performing steps S1007C to S1007E and step S1007B1 in this embodiment of this application.

In an embodiment, actions in steps S1007C to S1007E and step S1007B1 may be executed by invoking, by the processor 401 of the computer device 400 shown in FIG. 4, the application program code that is stored in the memory 403. This is not limited in this embodiment of this application.

Figure 15A:
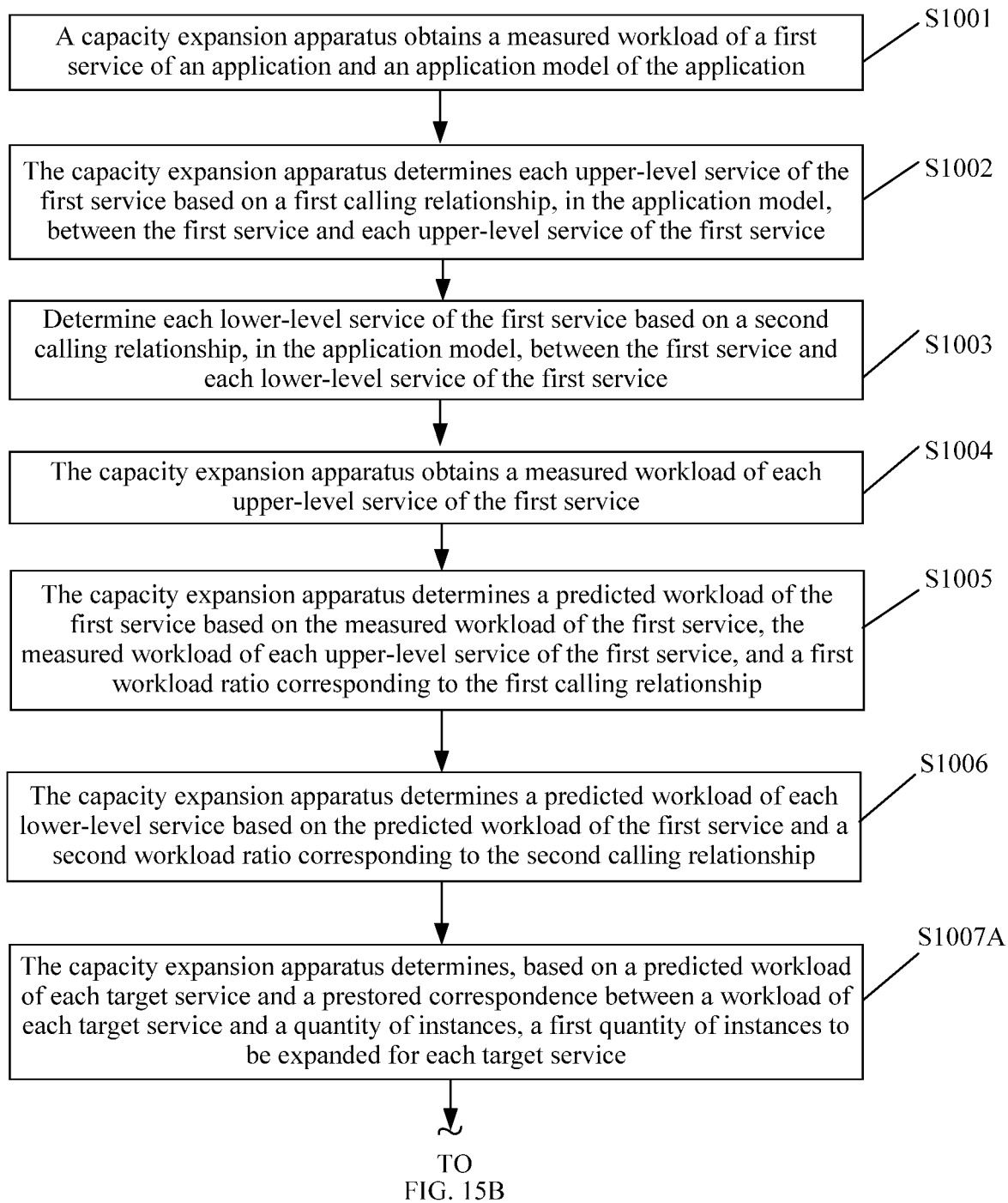
FIG. 15A and FIG. 15B are a schematic flowchart of another capacity expansion method according to an embodiment of this application.
Figure 15B:
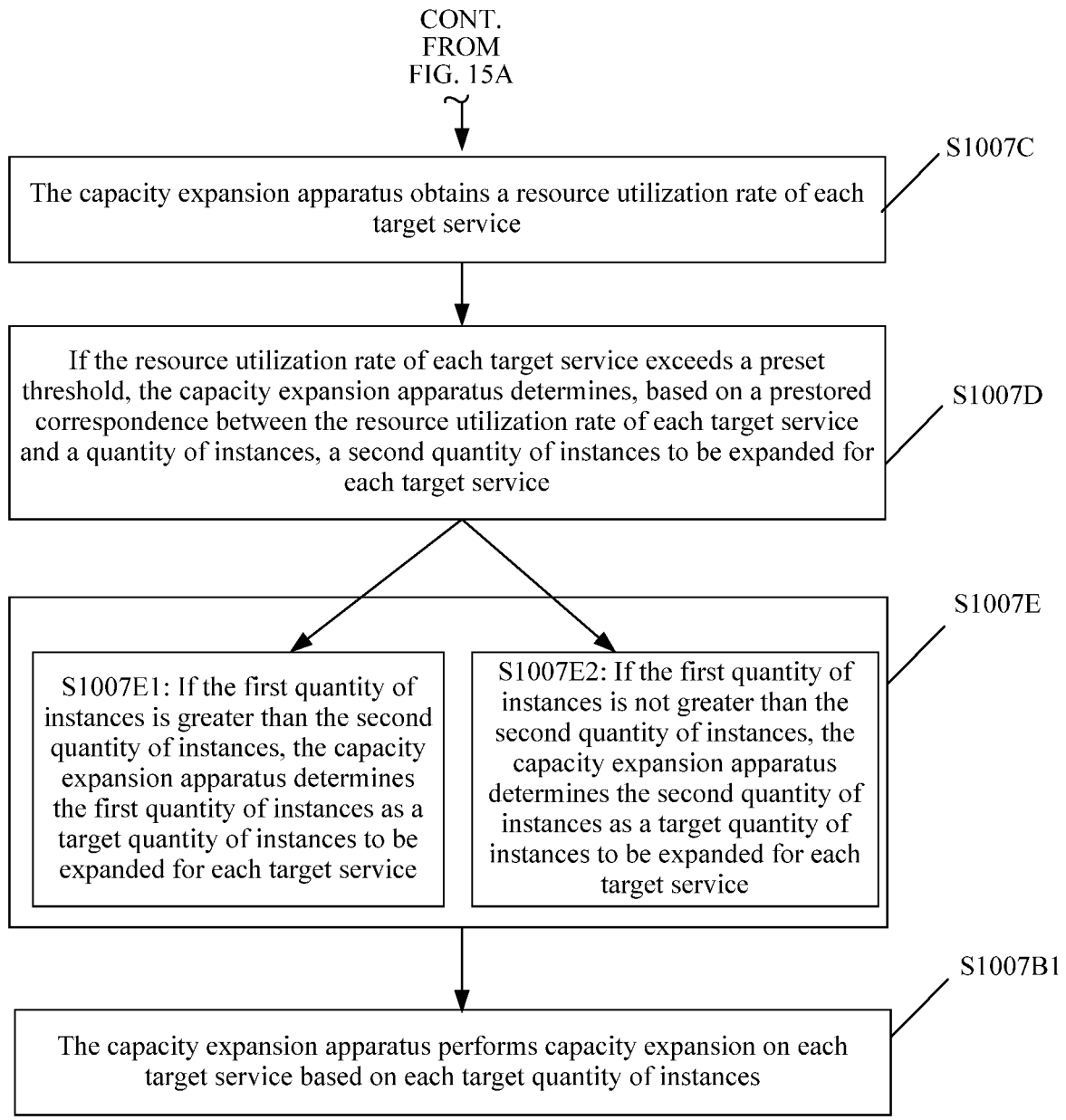

In a possible implementation, as shown in FIG. 15B, step S1007E includes steps S1007E1 and S1007E2.

S1007E1: If the first quantity of instances is greater than the second quantity of instances, the capacity expansion apparatus determines the first quantity of instances as the target quantity of instances to be expanded for each target service.

S1007E2: If the first quantity of instances is not greater than the second quantity of instances, the capacity expansion apparatus determines the second quantity of instances as the target quantity of instances to be expanded for each target service.

According to the capacity expansion method provided in this embodiment of this application, a quantity of instances to be expanded that is obtained based on a predicted workload of a service and a quantity of instances to be expanded that is obtained based on a resource utilization rate are compared, to obtain a target quantity of instances to be expanded such that a quantity of instances to be expanded for the service can be determined more accurately. Further, a quantity of instances needed to be expanded for a sub-service of the service can be determined more accurately based on the application model such that capacity expansion can be performed rapidly for the application and a more accurate instance to be expanded can be obtained. This guarantees SLA indicators such as application reliability, throughput, and response delay.

In an embodiment, with reference to FIG. 3, the scaling controller 310 of the capacity expansion apparatus 300 is configured to support the capacity expansion apparatus 300 in performing steps S1007E1 and S1007E2 in this embodiment of this application.

In an embodiment, actions in steps S1007E1 and S1007E2 may be executed by invoking, by the processor 401 of the computer device 400 shown in FIG. 4, the application program code that is stored in the memory 403. This is not limited in this embodiment of this application.

According to the capacity expansion method provided in the embodiments of this application, the calling relationship of the services of the application is determined based on the service interface description file of the service and the configuration file of the service, and the application model of the application is determined by calculating a workload ratio between the services. The application model can represent an association relationship between the services of the application, and therefore a predicted workload of any service of the application can be predicted based on the application model of the application and the target quantity of instances for capacity expansion of the target service can be calculated, and overall capacity expansion can be performed on the target service based on the target quantity of instances. This improves a capacity expansion efficiency, can rapidly enhance overall performance of the application within a short period, and further guarantees SLA indicators such as application reliability, throughput, and response delay.

The following describes the capacity expansion method in the embodiments of this application for illustration purposes using an example in which the first service is the service B of the application 1 in FIG. 6.

Step one: The capacity expansion apparatus obtains, at a T6 moment, a measured workload 1000 QPS of the service B and the application model of the application 1 shown in 6B in FIG. 6.

Step two: The capacity expansion apparatus determines, based on a calling relationship, in the application model, between the service B and each upper-level service of the service B, that the upper-level service of the service B is the service A.

Step three: The capacity expansion apparatus determines, based on a calling relationship, in the application model, between the service B and each lower-level service of the service B, that the lower-level service of the service B is the service D.

Step four: The capacity expansion apparatus obtains a measured workload 600 QPS of the service A at the T6 moment.

Step five: Using the workload prediction manner shown in FIG. 11, the capacity expansion apparatus calculates a predicted workload of the service B $f(B)=\max(d(B),\tau f(A)*e_{BA})=\max(1000,600*3)=1800$ QPS based on formula (1), the measured workload 600 QPS of the service A, the measured workload 1000 QPS of the service B, and the workload ratio 3, in the application model of the application 1, between the service B and the service A.

Step six: The capacity expansion apparatus calculates a predicted workload 3600 QPS of the service D based on the predicted workload 1800 QPS of the service B and the workload ratio 2, in the application model of the application 1, between the service D and the service B.

Step seven: The capacity expansion apparatus determines quantities of instances needed to be expanded for the service B and service D respectively based on a correspondence between the workload of the service B and a quantity of instances and between the workload of the service D and a quantity of instances.

It is assumed that Table 11 shows the correspondence between the workload of the service B and the quantity of instances. It can be learned from the foregoing processing capacity of each instance of the service B that each instance of the service B can process 300 QPS. The capacity expansion apparatus determines, based on Table 11, that the service B needs six instances. It can be learned from Table 1 and Table 3 that the service B currently has three instances. Therefore, the service B needs to add three instances.

It is assumed that Table 12 shows the correspondence between the workload of the service D and the quantity of instances. Likewise, it can be learned from the foregoing processing capacity of each instance of the service D that each instance of the service D can process 500 QPS. Because 3500 QPS<3600 QPS<4000 QPS, the capacity expansion apparatus determines, based on Table 12, that the service D needs eight instances. It can be learned from Table 1 and Table 3 that the service D currently has four instances. Therefore, the service D needs to add four instances.

TABLE 11

| Workload | Quantity of instances |
|---|---|
| 300 QPS | 1 |
| 600 QPS | 2 |
| 900 QPS | 3 |
| 1200 QPS | 4 |
| 1500 QPS | 5 |

TABLE 12

| Workload | Quantity of instances |
|---|---|
| 500 | 1 |
| 1000 | 2 |
| 1500 | 3 |
| 2000 | 4 |
| 3500 | 7 |
| 4000 | 8 |

It should be noted that for ease of description of the capacity expansion method in the embodiments of this application, the correspondence between the workload and the quantity of instances in this embodiment of this application is a linear growth correspondence. In an embodiment, the correspondence between the workload and the quantity of instances may alternatively be another correspondence such as a non-linear growth correspondence, and depending on a status in an embodiment, the correspondence between the workload and the quantity of instances may be determined as needed. This is not further limited in this embodiment of this application.

Step eight: The capacity expansion apparatus obtains a resource utilization rate of the service B and a resource utilization rate of the service D. For example, the capacity expansion apparatus determines, based on the following correspondence between a resource utilization rate and a quantity of instances, quantities of instances needed to be expanded for the service B and the service D, where the quantities of instances needed to be expanded for the service B and the service D are determined based on the resource utilization rates.

It is assumed that a preset threshold of the resource utilization rate of the service B is an ideal resource utilization rate does not exceed 70%. Assuming that a sum of resource utilization rates of three instances of the service B at the T6 moment is 210%, an ideal quantity of instances is 3. The service B currently has three instances, and therefore there is no need to perform capacity expansion for the service B based on the resource utilization rate of the service B.

It is assumed that a preset threshold of the resource utilization rate of the service D is an ideal resource utilization rate does not exceed 70%. Assuming that a sum of resource utilization rates of four instances of the service D at the T6 moment is 420%, an ideal quantity of instances is 6. The service D currently has four instances, and therefore two instances need to be added for the service D based on the resource utilization rate.

It should be noted that for ease of description of the capacity expansion method in the embodiments of this application, the correspondence between the resource utilization rate and the quantity of instances in this embodiment of this application is merely a correspondence, determined based on a policy provided in the example, between a resource utilization rate and a quantity of instances. In an embodiment, the correspondence between the resource utilization rate and the quantity of instances may alternatively be a correspondence determined based on another rule, and depending on a status in an embodiment, the correspondence between the resource utilization rate and the quantity of instances may be determined as needed. This is not further limited in this embodiment of this application.

Step nine: The capacity expansion apparatus determines, based on the quantities, respectively determined in step seven and step eight, of instances needed to be expanded for the service B and the service D, target quantities of instances to be expanded for the service B and the service D.

Although there is no need to perform capacity expansion for the service B based on the resource utilization rate of the service B, three instances need to be expanded for the service B based on the predicted workload of the service B. Therefore, a target quantity of instances to be expanded for the service B is three.

Based on the resource utilization rate, two instances need to be added for the service D. Based on the predicted workload of the service D, four instances need to be added for the service D. Because 4 is greater than 2, a target quantity of instances to be expanded for the service D is four.

Step ten: The capacity expansion apparatus simultaneously performs resource capacity expansion on the service B and the service D of the application 1 based on the foregoing calculated result that the quantity of instances to be expanded for the service B is three and the quantity of instances to be expanded for the service D is four.

It should be noted that the capacity expansion method provided in the embodiments of this application may not only be applied to an application that is developed based on a microservice development concept but also be used for an application that is developed based on a server-less computing architecture. A developer submits a complied function to the capacity expansion apparatus, and the capacity expansion apparatus dynamically determines a quantity of instances of the function depending on a workload requirement such that the capacity expansion apparatus can perform capacity expansion simultaneously on a plurality of functions, without considering impact of an infrastructure device such as a server and a network on the application. A result obtained from an application developed based on server-less computing may be applied to an Internet of Things (IoT) scenario. This is not further limited in the embodiments of this application.

All or some of the foregoing embodiments may be implemented using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer program instructions may be stored in a computer-readable medium or may be transmitted from a computer-readable medium to another computer-readable medium. For example, the computer program instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable medium may be any usable medium accessible by a computer, or a storage device, such as a server or a data center, integrating one or more usable media. The usable medium may be a magnetic medium (for example, a soft disk, a hard disk, or a magnetic tape), an optical medium (for example, a DVD), a semiconductor medium (for example, a Solid State Disk, (SSD), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A capacity expansion method, comprising:
obtaining a first measured workload of an application and an application model of the application, wherein the application comprises services, and wherein the first measured workload is of a first service of any of the services, wherein the application model comprises a calling relationship between the services and a workload ratio, wherein the workload ratio corresponds to each of the calling relationships;
determining upper-level services of the first service based on a first calling relationship between the first service and each upper-level service, wherein the application model comprises the first calling relationship;
determining lower-level services of the first service based on a second calling relationship between the first service and each of the lower-level services of the first service, wherein the application model comprises the second calling relationship;
obtaining a second measured workload of each of the upper-level services;
determining a predicted workload of the first service based on the first measured workload, the second measured workload and a first workload ratio that corresponds to the first calling relationship;
determining a predicted workload of each of the lower-level services based on the predicted workload of the first service and a second workload ratio that corresponds to the second calling relationship; and
performing capacity expansion on each target service based on a predicted workload of each of the target services, wherein the target services comprise the first service and each of the lower-level services.

2. The capacity expansion method of claim 1, further comprising:
obtaining a service interface description file of each of the services and a configuration file of each of the services, wherein the service interface description file comprises a name of each of the services, and wherein the configuration file comprises a calling relationship between each of the services and a lower-level service of each of the services;
determining the calling relationship between the services based on the calling relationship between each of the services and the lower-level service;
obtaining a workload history of each of the services based on the name of each of the services;
determining the workload ratio that corresponds to each calling relationship based on the workload history and the calling relationship between the services; and
generating the application model based on the calling relationship between the services, and the workload ratio.

3. The capacity expansion method of claim 1, further comprising:
obtaining a workload history of each of the services based on a name of each of the services;
updating the workload ratio based on the workload history and each of the calling relationships; and
updating the application model based on each of the calling relationships and an updated workload ratio that corresponds to each of the calling relationships.

4. The capacity expansion method of claim 1, further comprising:
obtaining each of a service interface description file of a third service, a configuration file of the third service, and an updated configuration file of each fourth service in response to the third service being added to an updated application, wherein the service interface description file of the third service comprises a name of the third service, wherein the configuration file of the third service comprises a third calling relationship between the third service and each fifth service, wherein the updated configuration file of each of the fourth services comprises a fourth calling relationship between each of the fourth services and the third service, wherein a fourth service of each of the fourth services is an upper-level service of the third service, and wherein a fifth service of each of the fifth services is a lower-level service of the third service;
updating the calling relationship between the services based on the application model, the third calling relationship, and the fourth calling relationship to obtain updated calling relationships;
obtaining a workload history of each service of the updated application based on a name of each of the services of the updated application;
determining a fourth workload ratio that corresponds to each of the updated calling relationships based on the workload history of each of the services of the updated application and an updated calling relationship between the services; and
updating the application model of the application based on the updated calling relationships and the fourth workload ratio.

5. The capacity expansion method of claim 1, further comprising:
obtaining an updated configuration file of each seventh service in response to a sixth service being deleted from an updated application, wherein before the sixth service is deleted from the updated application, the seventh service comprises an upper-level service of the sixth service, and wherein after the sixth service is deleted from the application, the updated configuration file of each seventh service comprises a fifth calling relationship between each of the seventh services and an eighth service, and wherein the eighth service is a lower-level service of each of the seventh services;
updating the calling relationship between the services based on the application model and the fifth calling relationship to obtain updated calling relationships;
obtaining a workload history of each service of the updated application based on a name of each of the services of the updated application;
determining a third workload ratio that corresponds to each of the updated calling relationships between the services based on the workload history of each of the services of the updated application and an updated calling relationship between the services; and
updating the application model of the application based on the updated calling relationships between the services, and the third workload ratio.

6. The capacity expansion method of claim 1, wherein determining the predicted workload of the first service comprises determining the predicted workload of the first service according to a preset formula comprising $f(v_i) = \max(d(v_i), \Sigma_{k \in K} f(k) * e_{ki})$, wherein V indicates a set of all the services of the application, wherein K indicates a set of upper-level services k of a service i of the application, wherein $K \in V$, $v_i$ indicates the service i, wherein $d(v_i)$ indicates a measured workload of the service i, wherein $f(k)$ indicates a measured workload of the upper-level service k of the service i, wherein $e_{ki}$ indicates a workload ratio between the service k and the service i, and wherein the service i is any one of the services.

7. The capacity expansion method of claim 1, wherein performing the capacity expansion on each of the target services comprises:
   determining a first quantity of instances to be expanded for each of the target services based on the predicted workload of each of the target services and a prestored correspondence between a workload of each of the target services and a quantity of instances; and
   performing capacity expansion on each of the target services based on the first quantity of instances.

8. A capacity expansion apparatus, comprising
   a processor, and
   a memory coupled to the processor and configured to store a plurality of instructions that, when executed by the processor, causes the processor to:
      obtain a first measured workload of a first service of an application, wherein the capacity expansion apparatus comprises the application;
      generate an application model of the application, wherein the application model comprises a calling relationship between services of the application and a workload ratio, wherein the workload ratio corresponds to each calling relationship between a service of the services and the workload ratio, wherein the first service is any of the services, and wherein the first service comprises upper-level services and lower-level services;
      determine the upper-level services based on a first calling relationship between the first service and each of the upper-level services, wherein the application model comprises the first calling relationship;
      determine the lower-level services based on a second calling relationship between the first service and each of the lower-level services, wherein the application model comprises the second calling relationship;
      obtain a second measured workload of each of the upper-level services;
      determine a predicted workload of the first service based on the first measured workload, the measured workload, and a first workload ratio, wherein the first workload ratio corresponds to the first calling relationship;
      determine a predicted workload of each of the lower-level services based on the predicted workload of the first service and a second workload ratio, wherein the second workload ratio corresponds to the second calling relationship; and
      perform capacity expansion on each of the target services based on a predicted workload of each of the target services, wherein the target services comprise the first service and each of the lower-level services.

9. The capacity expansion apparatus of claim 8, wherein the instructions further cause the processor to:
   obtain a service interface description file of each of the services, wherein the service interface description file comprises a name of each of the services;
   obtain a configuration file of each of the services, wherein the configuration file comprises a calling relationship between each of the services and a lower-level service of each of the services;
   determine the calling relationship between the services based on the calling relationship between each of the services and the lower-level service;
   obtain a workload history of each of the services based on the name of each of the services;
   determining the workload ratio that corresponds to each calling relationship based on the workload history and the calling relationship between the services; and
   generate the application model based on the calling relationship between the services and the workload ratio.

10. The capacity expansion apparatus of claim 8, wherein the instructions further cause the processor to:
    obtain a workload history of each of the services based on a name of each of the services;
    update the workload ratio based on the workload history and each of the calling relationships; and
    update the application model based on each of the calling relationships and an updated workload ratio that corresponds to each of the calling relationships.

11. The capacity expansion apparatus of claim 8, wherein the instructions further cause the processor to:
    obtain each of a service interface description file of a third service, a configuration file of the third service, and an updated configuration file of each fourth service in response to the third service being added to an updated application, wherein the service interface description file of the third service comprises a name of the third service, wherein the configuration file of the third service comprises a third calling relationship between the third service and each fifth service, wherein the updated configuration file of each of the fourth services comprises a fourth calling relationship between each of the fourth services and the third service, wherein a fourth service of each of the fourth services is an upper-level service of the third service, and a fifth service of each of the fifth services is a lower-level service of the third service;
    update the calling relationship between the services based on the application model, the third calling relationship, and the fourth calling relationship to obtain updated calling relationships;
    obtain a workload history of each service of the updated application based on a name of each of the services of the updated application;
    determine a fourth workload ratio that corresponds to each of the updated calling relationship based on the workload history of each of the services of the updated application and an updated calling relationship between the services; and
    update the application model of the application based on the updated calling relationship and the fourth workload ratio.

12. The capacity expansion apparatus of claim 8, wherein the instructions further cause the processor to:
    obtain an updated configuration file of each seventh service in response to a sixth service being deleted from an updated application, wherein before the sixth service is deleted from the updated application, the seventh service comprises an upper-level service of the sixth service, and wherein after the sixth service is deleted from the application, the updated configuration file of each of the seventh services comprises a fifth calling relationship between each of the seventh services and an eighth service, and wherein the eighth service is a lower-level service of each of the seventh services;
    update the calling relationship between the services based on the application model and the fifth calling relationship to obtain updated calling relationships;

obtain a workload history of each service of the updated application based on a name of each of the services of the updated application;

determine a third workload ratio that corresponds to each of the updated calling relationship between the services based on the workload history of each of the services of the updated application and an updated calling relationship between the services; and update the application model of the application based on the updated calling relationships between the services and the third workload ratio corresponding to each of the updated calling relationship between the services.

13. The capacity expansion apparatus of claim 8, wherein the instructions further cause the processor to determine the predicted workload of the first service according to a preset formula comprising $f(v_i)=\max(d(v_i),\Sigma_{k\in K}f(k)*e_{ki})$, wherein V indicates a set of all the services of the application, K indicates a set of upper-level services k of a service i of the application, wherein $K\in V$, $v_i$ indicates the service i, wherein $d(v_i)$ indicates a measured workload of the service i, wherein f(k) indicates a measured workload of the upper-level service k of the service i, wherein $e_{ki}$ indicates a workload ratio between the service k and the service i, and wherein the service i is any one of all the services.

14. The capacity expansion apparatus of claim 8, wherein the instructions further cause the processor to:
    determine a first quantity of instances to be expanded for each of the target services based on the predicted workload of each of the target services and a prestored correspondence between a workload of each of the target services and a quantity of instances; and
    perform capacity expansion on each of the target services based on the first quantity of instances.

15. A computer program product comprising computer-executable instructions stored on a non-transitory computer-readable medium that, when executed by a processor, cause an apparatus to:
    obtain a first measured workload of a first service and an application model of the application, wherein the application comprises the first service, and wherein the application model comprises:
        a calling relationship between services of the application; and
        a workload ratio that corresponds to each of the calling relationships, and wherein the first service is any of the services;
    determine upper-level services of the first service based on a first calling relationship between the first service and each upper-level service;
    determine lower-level services of the first service based on a second calling relationship between the first service and each lower-level service;
    obtain a second measured workload of each of the upper-level services;
    determine a predicted workload of the first service based on the first measured workload of the first service, the second measured workload, and a first workload ratio that corresponds to the first calling relationship;
    determine a predicted workload of each of the lower-level services based on the predicted workload of the first service and a second workload ratio that corresponds to the second calling relationship; and
    perform capacity expansion on each target service based on a predicted workload of each of the target services, wherein the target services comprise the first service and each of the lower-level services.

16. The computer program product of claim 15, wherein the computer program product further causes the apparatus to:
    obtain a service interface description file of each of the services and a configuration file of each of the services, wherein the service interface description file of each of the services comprises a name of each of the services, and wherein the configuration file comprises a calling relationship between each of the services and a lower-level service of each of the services;
    determine the calling relationship between the services based on the calling relationship between each of the services and the lower-level service;
    obtain a workload history of each of the services based on the name of each of the services;
    determine the workload ratio that corresponds to each calling relationship based on the workload history and the calling relationship between the services; and
    generate the application model based on the calling relationship between the services and the workload ratio.

17. The medium according to computer program product of claim 15, wherein the computer program product further causes the apparatus to:
    obtain a workload history of each of the services based on a name of each of the services;
    update the workload ratio that corresponds to each of the calling relationships based on a workload history and each of the calling relationships; and
    update the application model based on each of the calling relationships and an updated workload ratio that corresponds to each of the calling relationships.

18. The computer program product of claim 15, wherein the computer program product further causes the apparatus to:
    obtain a service interface description file of a third service, a configuration file of the third service, and an updated configuration file of each fourth service in response to the third service being added to an updated application, wherein the service interface description file of the third service comprises a name of the third service, wherein the configuration file of the third service comprises a third calling relationship between the third service and each fifth service, wherein the updated configuration file of each of the fourth services comprises a fourth calling relationship between each of the fourth services and the third service, wherein the fourth service is an upper-level service of the third service, and wherein the fifth service is a lower-level service of the third service;
    update the calling relationship between the services based on the application model, the third calling relationship, and the fourth calling relationship to obtain updated calling relationships;
    obtain a workload history of each service of the updated application based on a name of each of the services of the updated application;
    determine a fourth workload ratio that corresponds to each of the updated calling relationships between the services based on the workload history of each of the services of the updated application and an updated calling relationship between the services; and
    update the application model of the application based on the updated calling relationship and the fourth workload ratio.

19. The computer program product of claim 15, wherein the computer program product further causes the apparatus to:

obtain an updated configuration file of each seventh service in response to a sixth service being deleted from an updated application, wherein before the sixth service is deleted from the application, the seventh service comprises an upper-level service of the sixth service, and wherein after the sixth service is deleted from the application, the updated configuration file of each of the seventh services comprises a fifth calling relationship between each of the seventh services and an eighth service, and wherein the eighth service is a lower-level service of the seventh service;

update the calling relationship between the services based on the application model and the fifth calling relationship to obtain updated calling relationships;

obtain a workload history of each service of the updated application based on a name of each of the services of the updated application;

determine a third workload ratio that corresponds to each of the updated calling relationships between the services based on the workload history of each of the services of the updated application and an updated calling relationship between the services; and update the application model of the application based on the updated calling relationship between the services and the third workload ratio.

20. The computer program product of claim 15, wherein the computer program product further causes the apparatus to: determine the predicted workload of the first service of a preset formula, wherein the preset formula comprises $f(v_i)=\max(d(v_i),\Sigma_{k\in K}f(k)*e_{ki})$, wherein V indicates a set of all the services of the application, K indicates a set of upper-level services k of a service i of the application, $K \in V$, $v_i$ indicates the service i, $d(v_i)$ indicates a measured workload of the service i, f(k) indicates a measured workload of the upper-level service k of the service i, indicates a workload ratio between the service k and the service i, and the service i is any one of all the services.

* * * * *

UNITED STATES PATENT AND TRADEMARK OFFICE
CERTIFICATE OF CORRECTION

PATENT NO. : 11,216,310 B2  
APPLICATION NO. : 16/523028  
DATED : January 4, 2022  
INVENTOR(S) : Donghui Zhuo, Jun Xu and Haijun Shan Page 1 of 1

It is certified that error appears in the above-identified patent and that said Letters Patent is hereby corrected as shown below:

In the Claims

Claim 17, Column 36, Line 21: "The medium according to computer program" should read "The computer program"

Claim 20, Column 38, Line 16: "service i, indicates" should read "service i, $e_{ki}$ indicates"

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*